US010581986B2

(12) United States Patent
Tasdemiroglu et al.

(10) Patent No.: US 10,581,986 B2
(45) Date of Patent: Mar. 3, 2020

(54) DYNAMIC DETERMINATION OF PUBLIC SPACES AND THIRD PARTY DATA INCORPORATION FOR LOCATION-BASED MAPPING SYSTEMS AND METHODS

(71) Applicant: Turnoutt, Inc., Santa Monica, CA (US)

(72) Inventors: Sean Tasdemiroglu, Santa Monica, CA (US); James Richard Puccini, Mission Viejo, CA (US); Jason Connolly, Coto de Caza, CA (US); Andrew Firoved, Ladera Ranch, CA (US); Patrick MacDowell, La Mirada, CA (US); Noel Eom, Anaheim, CA (US)

(73) Assignee: Turnoutt, Inc., Santa Monica, CA (US)

( * ) Notice: Subject to any disclaimer, the term of this patent is extended or adjusted under 35 U.S.C. 154(b) by 0 days.

(21) Appl. No.: 15/996,331

(22) Filed: Jun. 1, 2018

(65) Prior Publication Data
US 2018/0352041 A1    Dec. 6, 2018

Related U.S. Application Data

(60) Provisional application No. 62/513,688, filed on Jun. 1, 2017.

(51) Int. Cl.
| *H04W 4/02* | (2018.01) |
| *H04L 29/08* | (2006.01) |
| *H04W 4/21* | (2018.01) |
| *H04W 4/021* | (2018.01) |
| *G06F 16/29* | (2019.01) |

(52) U.S. Cl.
CPC .............. *H04L 67/18* (2013.01); *G06F 16/29* (2019.01); *H04W 4/02* (2013.01); *H04W 4/021* (2013.01); *H04W 4/21* (2018.02)

(58) Field of Classification Search
CPC ............ H04W 4/02; H04W 4/21; H04L 51/20
See application file for complete search history.

(56) References Cited

U.S. PATENT DOCUMENTS

| 7,876,215 B1 * | 1/2011 | Brady, Jr. ............. H04W 4/029 340/539.11 |
| 9,485,617 B2 * | 11/2016 | Tasdemiroglu ....... H04W 4/029 |
| 2012/0197709 A1 * | 8/2012 | Kendall ............. G06Q 30/0207 705/14.36 |
| 2013/0185368 A1 * | 7/2013 | Nordstrom ........ H04L 29/08072 709/206 |
| 2015/0201304 A1 * | 7/2015 | Tasdemiroglu ....... H04W 4/029 455/456.3 |
| 2018/0144440 A1 * | 5/2018 | Andrew .................... G06T 3/40 |

OTHER PUBLICATIONS

Google, Captured May 31, 2018, Stack Overflow, 3 pages.

* cited by examiner

*Primary Examiner* — Jeong S Park
(74) *Attorney, Agent, or Firm* — Fish IP Law, LLP

(57) ABSTRACT

A system that allows participating users to find other users with similar interests or characteristics based on a map area on a requesting device and the characteristics of each user. The system only reports a counter so as to preserve user anonymity and safety. The system preserves the user anonymity and safety in even granular searches using zoomed-in map views by comparing a map elevation level with a threshold and then a counted number of matched devices against a number of devices threshold. If the map is too zoomed in and there are not enough devices within the zoomed in area, the system does not provide a counter.

10 Claims, 21 Drawing Sheets

DYNAMIC DETERMINATION OF PUBLIC SPACES AND THIRD PARTY DATA INCORPORATION FOR LOCATION-BASED MAPPING SYSTEMS AND METHODS

This application claims priority to U.S. provisional application 62/513,688, filed Jun. 1, 2017. U.S. provisional application 62/513,688, and all other extrinsic references contained herein are incorporated by reference in their entirety.

FIELD OF THE INVENTION

The field of the invention is in privacy, security, and reliability of social networking using dynamic location mapping and sharing between a plurality of user devices in a network.

BACKGROUND

The background description includes information that may be useful in understanding the present invention. It is not an admission that any of the information provided herein is prior art or relevant to the presently claimed invention, or that any publication specifically or implicitly referenced is prior art.

Social networks and other location-based services have allowed users to broadcast their locations to other users of the network, contacts, such that they could find their friends, groups of similarly-interested people, or for other purposes. However, by broadcasting a user's precise location, a user surrenders any privacy or anonymity that they might have had in a public place or within a crowd. This is potentially embarrassing or dangerous to the user as it may alert people with ill intentions of their location and, by inference, potential vulnerabilities or other information that the user would prefer to keep secret.

The system of commonly-owned U.S. Pat. No. 9,485,617 to Tasdemiroglu ("the '617 Patent") provides a solution to some of the problems of prior location-based user systems. The system of the '617 Patent provides a way for users to find similarly-interested people while maintaining a level of anonymity and privacy for the individual users.

However, there is still a need for a system that provides greater user privacy and anonymity protection, greater accuracy in the counting methods, and greater user customizability in the groups they seek beyond those discussed in the '617 Patent or any prior system.

SUMMARY OF THE INVENTION

The inventive subject matter provides apparatus, systems and methods in which a system receives a request from a participating mobile computing device to obtain a number of other participating mobile devices are present in a map area viewed by a user on the requesting mobile computing device based on demographics characteristics, and where the server of the system checks the viewing altitude of the map and the number of matching devices within the area to determine whether the requesting device should be able to display the counter. If the map view on the requesting device is too zoomed in (under an elevation level threshold), the system checks the number of matching devices within the area against a threshold and if the number of devices is under the threshold, no counter is displayed. If the number of users is sufficiently high or the map view is zoomed out enough to be greater or equal to the elevation threshold, the server sends the requesting device a count of the devices which is presented to the user in the form of a counter.

In embodiments, the system can designate geographic areas or locations as public such that only the devices within those areas will be counted.

In embodiments, the system is programmed to zoom in the view based on the counted devices so as to better fit the results, without displaying the actual locations of the participating users.

In embodiments, the system is programmed to analyze groups of counted devices according to altitude information such that, in a building or other vertical structure, only those devices within a range or cluster are counted, thus solving a challenge associated with using a flat map for the analysis.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
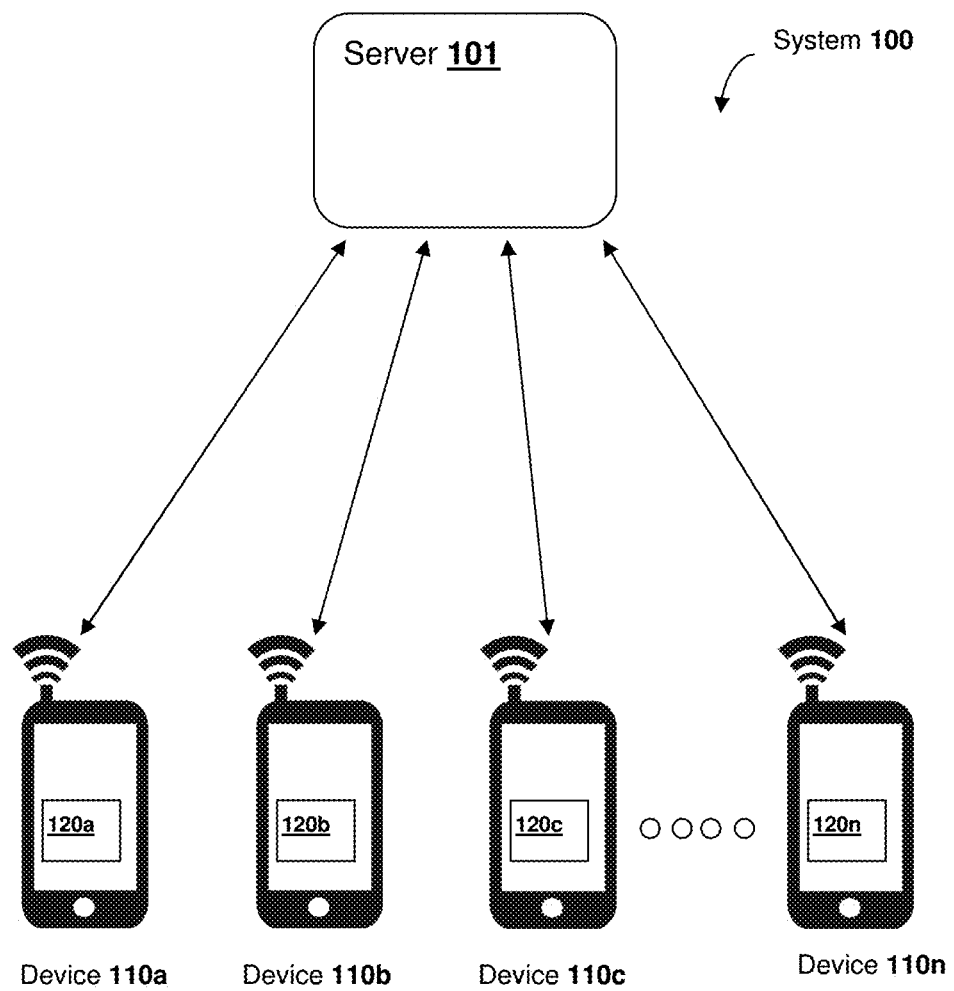
FIG. 1 provides a diagrammatic overview of various components of the system according to an embodiment of the inventive subject matter.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIG. 1 provides a diagrammatic overview of the components of system 100 according to an embodiment of the inventive subject matter.

Server 101 of FIG. 1 is programmed to execute the server-side aspects of the inventive subject matter. Server 101 is shown here as a single server, but it is understood that server 101 can be one computer, or multiple computers locally connected to one another or at different locations connected via an information exchange network (e.g., the Internet, cellular, etc.). The server 101 includes at least one processor and at least one non-transitory computer-readable storage medium that stores computer-executable instructions that, when executed by the at least one processor, execute the various functions of the server discussed herein. The server 101 also includes appropriate information exchange components to exchange data with other computing devices (e.g., wireless and/or wired, local and/or remote communication protocols) both within and without the system 100.

Client devices 110a-110n (collectively, client devices 110) are computing devices used by respective users to interact with the server 101. The client devices 110 can each communicate with the server 100 via a wired (e.g., USB, HDMI, etc.) or wireless communication protocol (e.g., cellular, WiFi, near-field communication, etc.) to exchange data via the internet, an intranet, other data communication systems, or a combination thereof. Examples of client devices 110 include cellular radiotelephones, smartphones, cell phones, personal digital assistants (PDAs), personal communications systems (PCS) terminals, computers (e.g., laptop, tablet, desktop or palmtop computers), gaming consoles, etc. The client devices 110 each include at least one processor and at least one non-transitory computer-readable storage medium that stores computer-executable instructions that, when executed by the at least one processor, execute the various functions of the client device as discussed herein.

In the embodiment shown, client devices 110a-110n each have installed respective applications 120a-120n (collectively referred to as application 120) through which the users interact with and access the functions of the inventive subject matter. Where a particular function is discussed as being executed by the system 100 generally and unless mentioned otherwise, it is understood that the function can be performed entirely by the server 101, entirely by the client device 110, or distributed among the server 101 and client device 110.

A user can register for the system by providing some information such as an email address, name, and other identifying information, thus creating an account. This can be done via the application 120 downloaded and installed on to the user's computing device 110 (such as a mobile device) or via a website accessed via the browser.

The application 120 is programmed to present a plurality of demographic characteristics for selection by the user. The demographic characteristics are data attributes that describe the user and are used by the system to match and filter as discussed in greater detail herein. Via the application 120, the user is able to select demographic characteristics that apply to them.

Demographic characteristics can include general information such as the gender of the user, age of the user, etc.

Demographic characteristics can also include more specific information about user lifestyles or interests in general as well as about specific interests in the moment. For example, selectable demographic characteristics can include lifestyle preferences (e.g., vegetarian, etc), preferred hobbies or activities, specific sports a user likes, music genres, television genres, movie genres, food preferences, individual artists or works of art (e.g., favorite musician/group/movie/television show/book/author, etc). Selectable demographic characteristics can also include characteristics reflecting a user's current interests—that the user is seeking out or in the mood for a particular activity or experience (e.g., looking for a soccer game, looking for a bar, seeking out live music of a particular genre, etc.).

Figure 3:
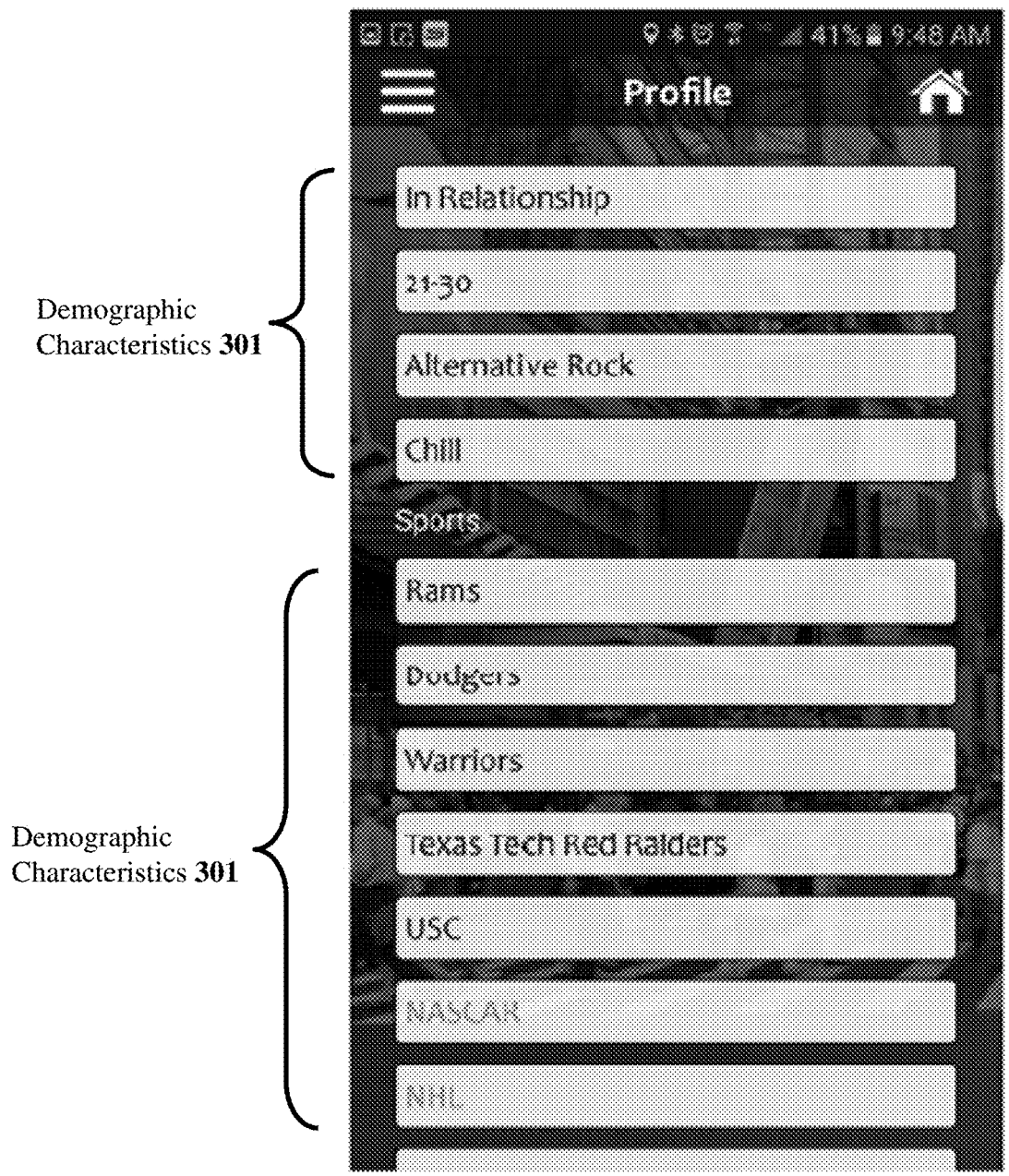
FIG. 3 provides an illustrative example of a screenshot including various types of demographic characteristics according to embodiments of the inventive subject matter.

FIG. 3 provides an illustrative example of a screenshot including various types of demographic characteristics (labeled as demographic characteristics 301 in FIG. 3) that a user can enter into their profile during registration as part of the profile creation or, at a time following registration with system 100, to update or add to the user profile.

In embodiments, certain demographic characteristics are considered "baseline" characteristics and cannot be unselected by the user. Thus, in these embodiments, the baseline characteristics will always be selected for the purposes of the counting and filtering. Examples of baseline characteristics can include gender, age, or other basic demographic characteristics. However, these can be determined by the administrator/organization operating system 100 and as such any of the demographic characteristics can be flagged as a baseline characteristic.

In embodiments of the inventive subject matter, the application 120 of a client device 110 causes the client device 110 to transmit the device's location to the server 101, along with the individual user's selected characteristics. The location information transmitted by the client devices 110 can be GPS data or any other type of location data (e.g. via cellular triangulation or other location-determination means). Thus, the server 101 gathers the location and selected characteristics of all of the client devices 110 that are using the system (via application 120). This location and characteristics information can be automatically, periodically reported by the application 120 to the server 101 on each client device 110 during the time the application 120 is active, even if the user is not actively engaging with the application (i.e., if the user's smartphone is in their pocket).

Figure 2:
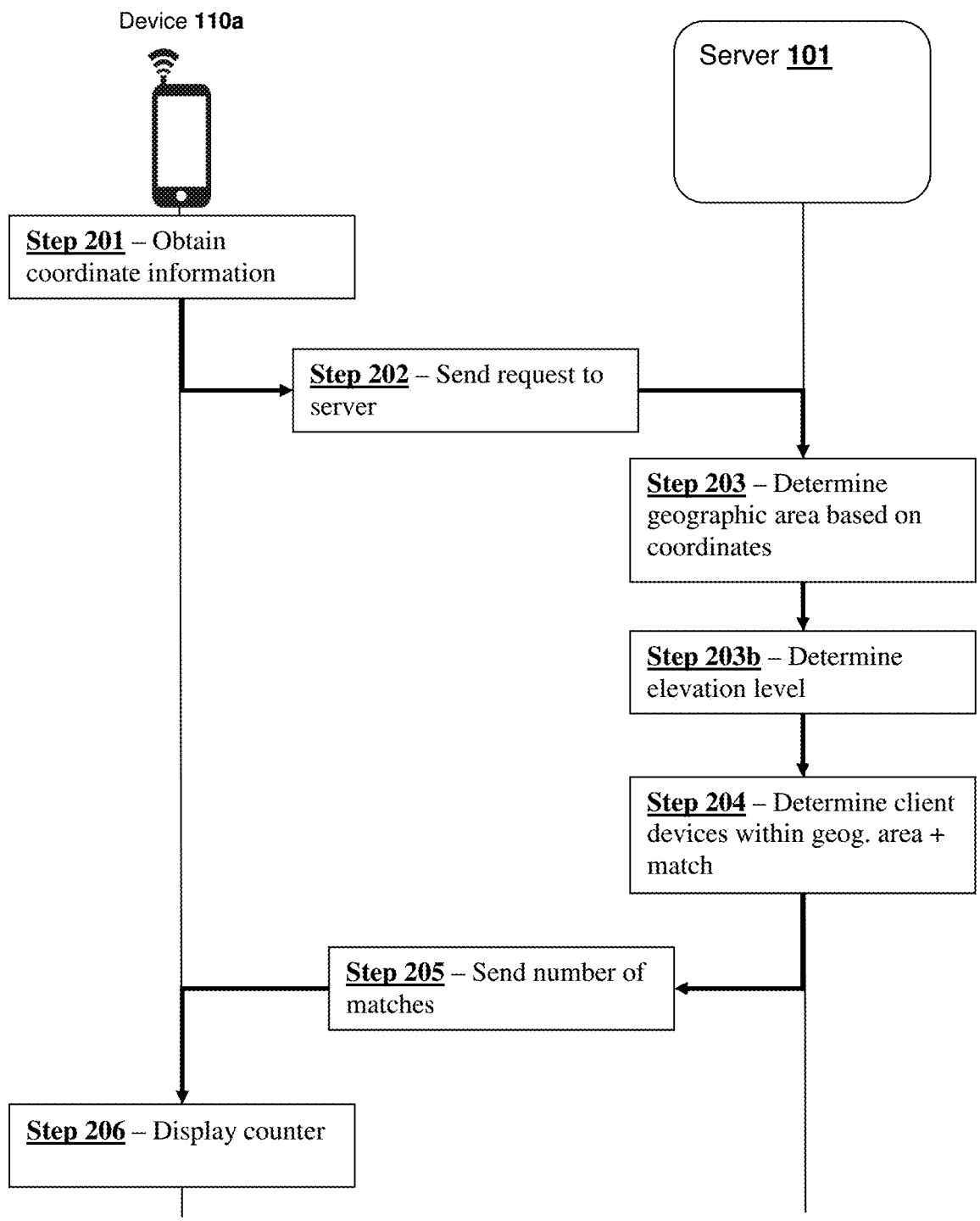
FIG. 2 illustrates a flowchart of the process executed by the system to present a user with the number of people sharing similar characteristics in a given area, according to embodiments of the inventive subject matter.

The application 120 allows a user to see how many people with similar characteristics there are in a particular area. FIG. 2 illustrates a flowchart of the process executed by the system 100 to present a user with the number of people sharing similar characteristics in a given area.

An example of a system that allows for a user to find location-based information of a plurality of people based on demographic characteristics of the group of people is provided in commonly-owned U.S. Pat. No. 9,485,617 to Tasdemiroglu ("the '617 Patent"), incorporated herein by reference in its entirety.

Figure 4:
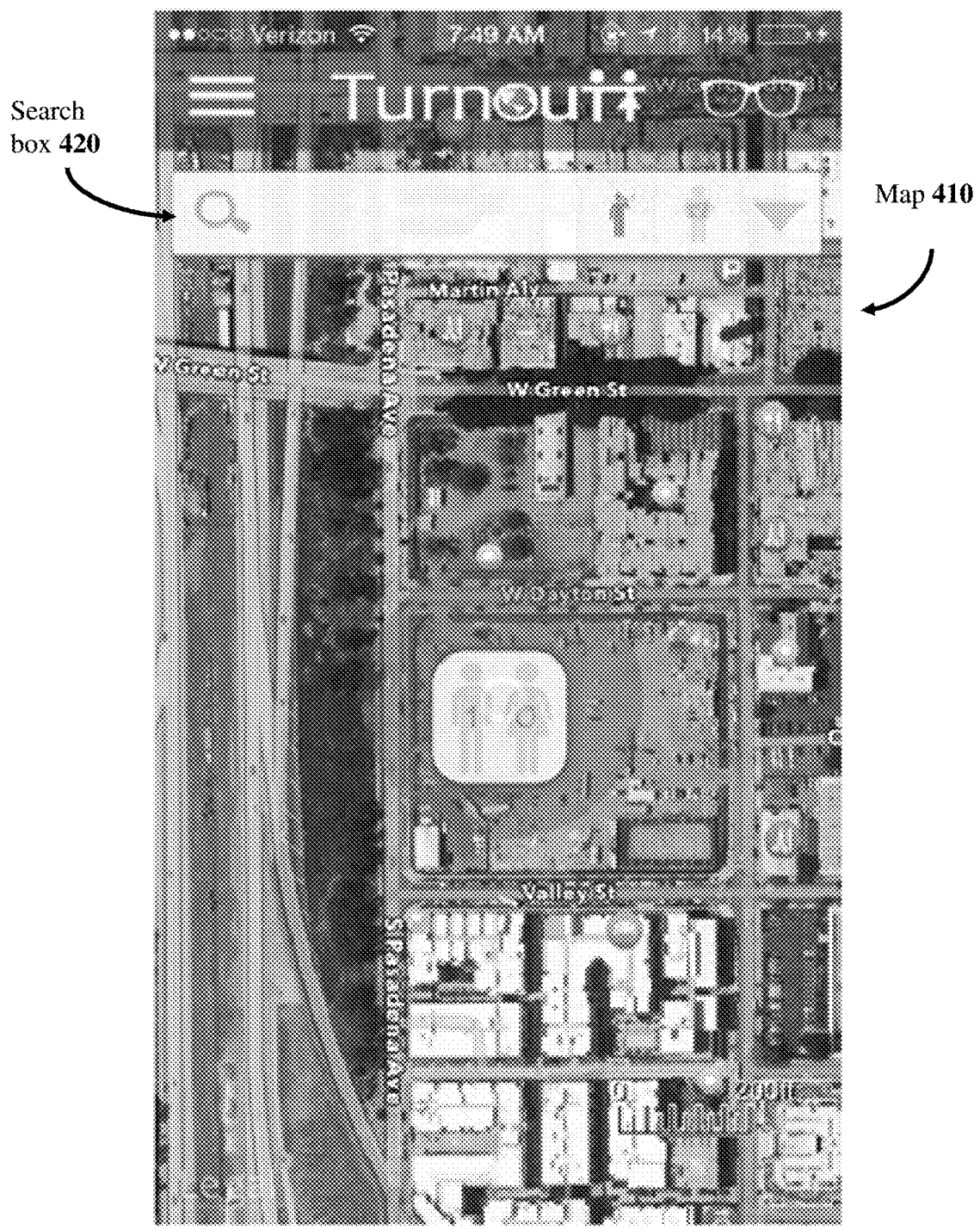
FIG. 4 provides an illustrative example of the map application used by application, according to embodiments of the inventive subject matter.

To allow a user to search for matches in a given area, the application 120 presents a map via an integrated map application. In embodiments such as the one illustrated herein, the map application is provided by a third party service such as Google Maps, Apple Maps or other similar map-providing service and integrated into the application as is known in the art to provide satellite views, map views, and provide certain searching, scrolling and zooming functionality leveraged by the application 120 for the functions discussed herein. In other embodiments, the map can be stored by server 101 and/or by the client device 110. The presentation of the map/search function can be a default function of the application 120 that initiates upon startup or execution of the application 120, or can be selectable from within the application 120 after initializing. An illustrative example of the map application 410 used by application 120 is shown in FIG. 4. The example in FIG. 4 is for illustrative purposes and is shown to include a counter, but it should be noted that the application 120 at this stage prior to conducting the search does not display a counter as the search for other users has not yet occurred.

For the purposes of clarity in illustrating the processes herein, device 110a will be considered the requesting device of a user wishing to perform the search functions illustrated herein. The other devices 110b-110n are considered to be devices of other users.

At step 201, the application 120a on device 110a obtains two (x, y) coordinate points corresponding to two points on the screen. The application 120a calls to the third party map service to obtain the longitude/latitude information corresponding to these two on-screen points.

Figure 5A:
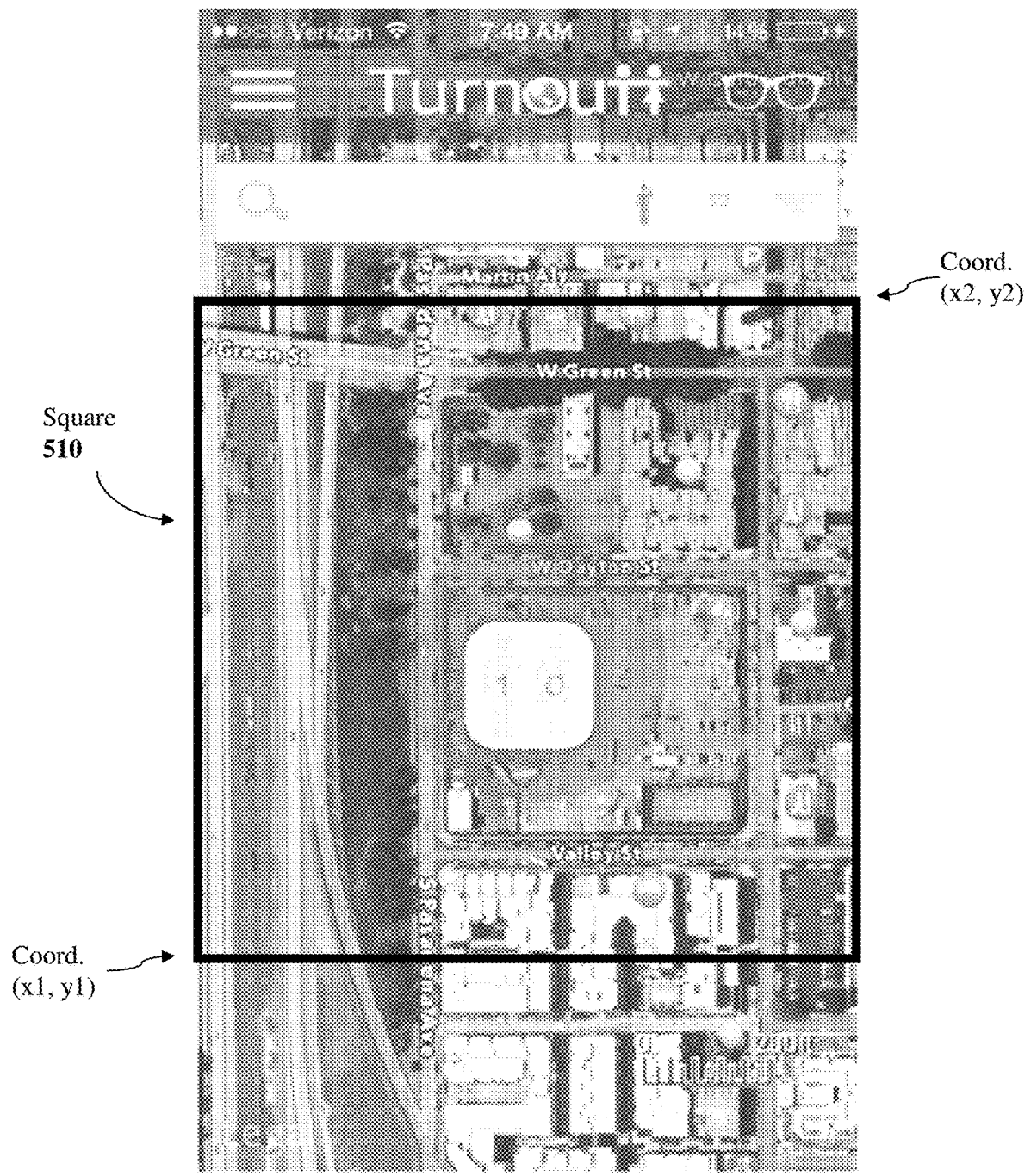
FIG. 5A provides an illustration of the square used to calculate coordinates for various system functions, for illustrative purposes, according to embodiments of the inventive subject matter.
Figure 5B:
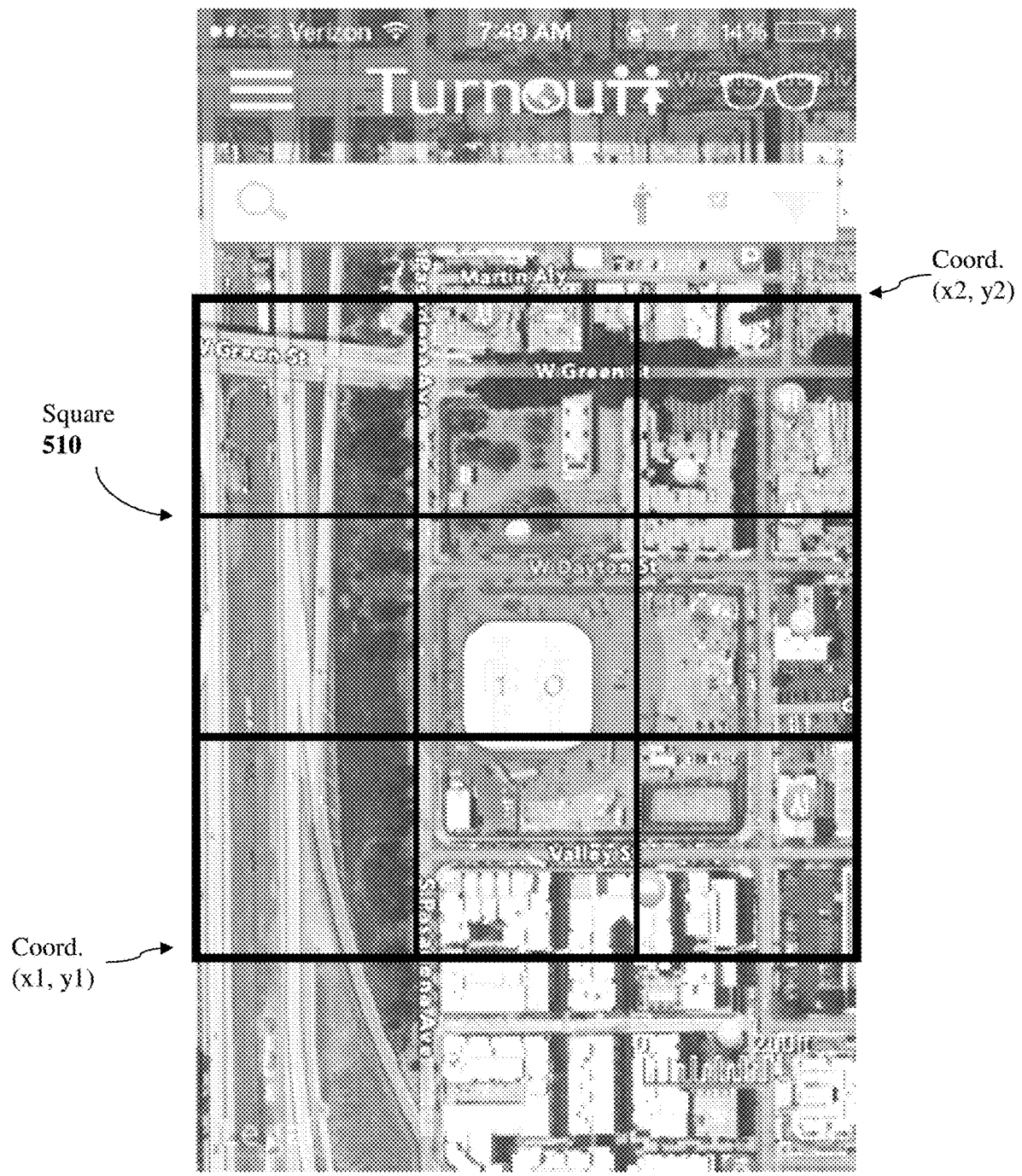
FIG. 5B provides an illustration embodiments of the inventive subject matter that include grid square subdivisions used to calculate coordinates for various system functions, for illustrative purposes.

In embodiments, the application 120 applies a square map grid 510 on the screen (that is invisible to the user) that is equal to the width of the device 110 (or the height, whichever is shorter, i.e. if they were on a tablet with inverted dimensions) squared. For example, if the screen of device 100 were 800 pixels wide, the "square" overlaid on the screen would be 800 pixels by 800 pixels with its middle point being centered within the screen. FIG. 5A provides an illustration of the square 510 that is visible in the figure for illustrative purposes. The application 120a then grabs 2 point (x, y) coordinates: the bottom left of that square (x1, y1) and the top right of the square (x2, y2). The application 120 then calls to respective map program/service to obtain the actual latitude/longitude at the points as they are projected on to the map at the specific spots. The example in FIG. 5 is for illustrative purposes and is shown to include a counter, but it should be noted that the application 120 at this stage prior to conducting the search does not display a counter as the search for other users has not yet occurred.

In preferred embodiments, the map presented by the client device 110 is centered around the user's current location, as determined by the client device's location determination components (e.g., GPS or other location determination methods). In certain operating systems or environments, the user may be required to grant permission to application 120 to access the device 110's location data/services. If these permissions are not given or inactive, the application 120 is programmed to prompt the user to enable the permissions.

As shown in FIG. 4, a user can search for a particular address using the search functionality integrated via the map by typing the address into search box 420. When a user searches for an address, the map will center around the requested address.

In embodiments of the inventive subject matter, a user can search by scrolling along a map, whereby the application 120 overlays a circle or other shape over the map. As the user scrolls, zooms in or out, the circle remains the same size and in the same location of the screen. However, because the map area covered by the circle changes due to scrolling or zooming in or out, the user can thus search for other users according to the criteria within the circle. Thus, in these embodiments, the server 101 will search for devices of other users based on those devices' GPS locations and the coordinates of the map covered by the circle and provide a counter of users within the real-world area represented by the circle. As with the other embodiments discussed herein, the user can also filter according to user characteristics and affect the counter results accordingly.

At step 202, the application 120a sends a request to the server 101 that includes the coordinate points determined in step 201 as well as the demographic characteristics selected by the individual user. Depending on the map service that is integrated into the application, the request can include other information such as zoom level or elevation level, etc. In embodiments, the request will also include altitude information as gathered from the client device's GPS or other location determination components.

In preferred embodiments, the demographics characteristics to be sent to server 101 for the purposes of having the user's device 110 counted (e.g., the characteristics "broadcast" to the server) and also for the purposes of conducting a search are selectable by the user. Thus, the system 100 only uses those selected demographic characteristics and ignore the unselected ones. It should be noted that, in embodiments, the demographic characteristics selected for broadcast can be selected differently than those being selected for a search. Thus, a particular user may wish to search for a particular characteristic and select only that characteristic for search, but broadcast a plurality of characteristics for the purposes of being counted.

The demographic characteristics broadcast by a device for counting can be treated by the server 101 to match with either an "OR" logic or an "AND" logic. This can be adjusted by a system administrator. Thus, if a particular user broadcasts demographic characteristics of "Cubs fan", "looking to play soccer", and "likes motorcycles" the server 101 can be programmed to count this user's device in a search if the searching device 101 matches one of those demographic characteristics (the "OR" logic) or, to match only if the searching device matches all of the selected characteristics (the "AND" logic).

In embodiments, a user is able to manually filter the map according to the demographic characteristics of other users corresponding to interests, traits or other characteristics of the particular users. Thus, from a large pool of system users, a searching user is able to see a count of users fitting the filter criteria selected in a particular geographic location or area.

In embodiments of the inventive subject matter, the system 100 is programmed such that the filters used to filter the counter results for a particular geographic area according to a particular characteristic such as those discussed in the '617 Patent and also those discussed herein are only accessible to the user if the user has provided information related to or allowed access to that particular characteristic themselves for use by server 101. Thus, a user would only be allowed to apply a "looking to watch a game" filter or "looking for a date" filter if they have provided the information and allowed the server 101 to use that information to include the user among the counted users for other requesting users. In embodiments, the server 101 is programmed to gray out filter options corresponding to those that a user has a lack of provided information or lack of approval. In other embodiments, these filter options are simply not presented to the user until the information is provided or approval for system use of the information is provided.

Figure 6:
FIG. 6 illustrates examples of various filters that a user can apply such that the counter returned by server of users in a particular area is filtered to those that share the characteristics selected by the user, according to embodiments of the inventive subject matter.

FIG. 6 illustrates examples of various filters that a user can apply such that the counter returned by server 101 of users in a particular area is filtered to those that share the characteristics selected by the user. As seen in FIG. 6 the filters include demographic characteristics (also referred to as profile characteristics). The filters can also include groups (either sponsored, trending, or those groups that the user has joined), and polls. The ability to join groups, and the functions associated with the creation, transmission and engagement with polls is discussed in greater detail below.

The transmission of the request at step 202 can be automatic upon accessing the map/search screen, according to already-selected filters of demographic characteristics. Alternatively, the request can be manually triggered by the user via a "Search" button or other on-screen prompt and/or after the affirmative selection of demographic characteristics to use as filters.

At step 203, the server 101 uses the two coordinate points to determine the geographic area that is being viewed on the map presented by client device 110a. Because the two coordinate points correspond to opposite corners of a square, the server 101 can determine the geographic area on the map corresponding to the square.

At step 203b, the server 101 also calculates the elevation level corresponding to the altitude at which the map is being viewed on requesting device 110a. To find the elevation level, the server 101 calculates the center point of the square based on the received coordinates. Then, the server 101 calculates the distance between the centerpoint and one of the corner coordinates and uses this distance as a radius projecting upwards from the centerpoint to determine the elevation level. In embodiments, the elevation level is equal to this calculated distance.

The following is an illustrative example of calculations performed by server 101 to determine the elevation level:

$$\text{var } d\text{Lat}=\text{Math.AbsoluteValue(latfinish}-\text{latstart);} //1 \text{ degree}=111 \text{ km}=111000 \text{ m}$$

$$d\text{Lat}=d\text{Lat}*111000;$$

$$\text{var radiusinmeters}=d\text{Lat}/2;$$

Because the "dLat" variable is the distance between the 2 corners in degrees, it needs to be converted to meters. The variable "radiusinmeters" is the radius from the center of the square to a corner coordinate of the square. This is the value used as the elevation level (in meters, in this example).

In other embodiments, the request from device 110a also includes the coordinates for the center point of the square. If the map viewed by device 110a is based on the current location of the device 110a (e.g., based on GPS data), the server 101 uses the GPS data as the centerpoint of the square.

As known in the art, map applications such as Google Maps allow a user to zoom in or out of the map at different levels that allow a user to view a smaller area at greater detail as the user zooms in, and to view a larger area at lesser detail as the user zooms out. Certain map applications can equate the level of zoom to a particular simulated viewing altitude or elevation (e.g., 100 ft above the ground, 500 ft, 1000 ft, etc). Therefore, in embodiments, the request 202 received by the server 101 can include this information and can be used instead of or in addition to the server's own elevation level calculations.

At step 204, the server 101 determines whether any other client devices 110b-n are within the area based on the reported location information of all of the devices 110b-n accessing the system. Of those other client devices 110b-n that are within the area viewed by the requesting client device 110a, the server then filters the client devices 110b-n based on a match of the selected demographic characteristics in application 120a and the selected demographic characteristics reported by the respective applications 120b-n of each device. The server 101 then counts the amount of client devices 110*b-n* that are both within the geographic area and match at least one selected demographic characteristic.

It should be appreciated that, in other embodiments, the order of the functions within step 204 can be carried out such that the server 101 first matches the request to all client devices 110*b-n* based on a match of the demographics characteristics first and then matches based on a location of the devices 110*b-n* being within the area.

At step 205, the server 101 returns the number corresponding to the number of users within the area that matches with a demographic characteristic to the requesting client device 110*a*. The application 120*a* then displays the information to the user in the form of a counter 710 at step 206.

Figure 7:
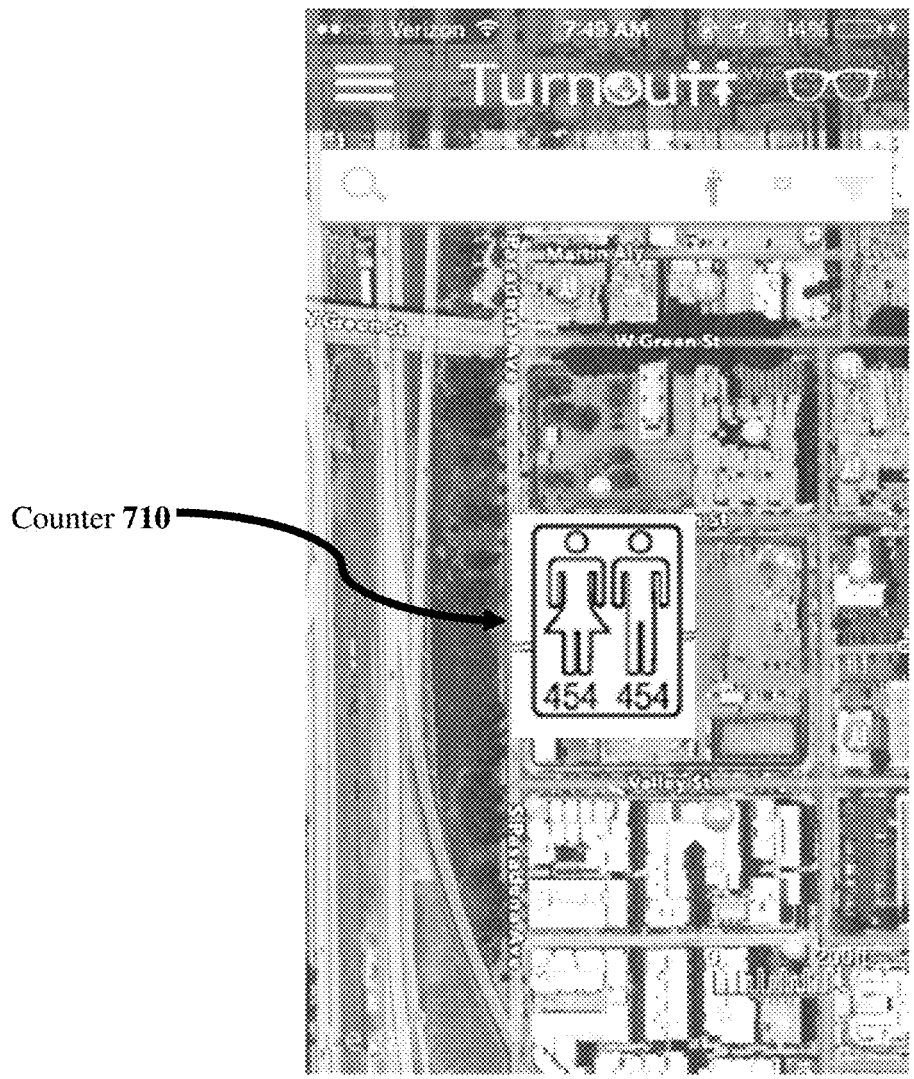
FIG. 7 provides an example of a counter presented to a user, according to embodiments of the inventive subject matter.

In embodiments such as the one illustrated herein, the server 101 returns a number associated with the number of male users and another number associated with female users within the area. This is then presented to the user as shown in FIG. 7.

Since devices 110 executing application 120 report their locations and demographic characteristics (or changes to the demographic characteristics) regularly, the server 101 is programmed to dynamically update the count of the plurality of counted users for a particular request from a particular device based on each of the plurality of devices 110 reporting to the server 101 and the demographic characteristic of the plurality of people. Thus, as devices 110*b-n* running respective applications 120*b-n* enter or exit the area, engage or disengage the application 120, and/or change their demographic characteristics, the information is pushed by the server 101 to the application 120*a* of device 110*a* such that the counter displayed is updated accordingly.

The server 101 dynamically stores/updates GPS coordinates and settings received from devices 110, interests of the plurality of people of all network devices, stores advertisers static locations, updates advertisements based on inputs of the plurality of people at the plurality of locations and populates stored information on universal map shared by the plurality of people. The cloud platform receives the demographics labels/characteristics from each user's profile (the selection of the characteristics in application 102), stores and makes retrievable to all users on the network via the filtering described herein. Then receives request to filter user's map by a label/characteristics and determines all users in viewing window of map that have that label saved in their profiles and then sends results to user for display via the application 120.

If the user scrolls the map manually, zooms out on the map or zooms in, the application 120 of client device 110 submits a new request to server 101 with the corresponding coordinate information and the demographic characteristics.

In embodiments, the client device 110 monitors the user's inputs and detects when the user stops providing input (via application 120 or another input detection program installed on client device 110). On touch-screen devices, the device 110 detects when the user removes their finger from the screen. This action triggers a timer within application 120. In other devices, the device 110 counts the time since the last input (e.g., last movement of the mouse or keystroke). Upon reaching a timer threshold of inactivity (e.g., $\frac{1}{10}^{th}$ of a second or other relatively short period of time), the device 110 then obtains the new coordinate points and sends a new server call with the corresponding coordinate information and characteristics as in steps 201-202 above.

In embodiments, the system 100 is programmed such that the application 120*a* on a requesting device 110*a* can resize the map based on the location of the counted devices 110*b-n* to get a more accurate view of the distribution of the devices within the area. In these embodiments, the "zoom-to-fit" process is performed by the application 120*a* on the device 110*a*. An example of this process is as follows:

As discussed above, the server 101 determines all of the devices 110*b-n* that are within the search area and match the demographic characteristic(s) of the request at step 204 of FIG. 2. The server 101, along with the counter information, sends the coordinate information of each of the counted devices.

The application 120*a* first determines the new corner values of square 510 that the view will zoom in to, to fit all of the counted devices 110*b*-110*n*. To do this, the application 120*a* uses the coordinate information of the counted devices and selects the extreme coordinate values from the group of counted devices for each cardinal direction as the new corners of the square 510.

In embodiments, the square 510 is subdivided into a grid of smaller squares, where the application 120*a* is aware of the screen position coordinates of the corners of each of the grid squares, and determines the map coordinates for each of the corners of the grid squares via the map application. In the example illustrated in FIG. 5B, the square 510 is divided into a 3×3 grid and as such has nine grid squares. As with FIG. 5A, the square 510 and grid squares are not visible to the user but are visible in the figures for illustrative purposes. In these embodiments, the application 120*a* is programmed to, based on the coordinates of the counted devices and the coordinates of all possible squares made up of grid squares (not just the individual grid squares, but also squares formed by 2×2 combinations of the individual grid squares), determine the smallest square that fits all of the counted devices. The map is then resized to that square such that the map includes a zoomed in view that still contains all of the counted devices.

In a variation of these embodiments, the server 101 counts the mobile computing devices 110*b*-110*n* within each of the individual grid squares by applying the processes discussed herein to the area corresponding to each of the grid squares. To do this, the request message sent at step 202 includes the coordinate information of all of the grid squares. For these embodiments, the elevation level calculated based on the large square 510 is still used.

In these embodiments, the server 101 returns counter information for each of the squares and a separate counter is displayed in each grid square that shows the number of counted devices for that individual grid square only. If the user wishes to zoom in, they can press the counter of the grid square. The application 120*a* then zooms in using the corners of the selected grid square as the new coordinates for the zoomed-in view and adjusts the map view accordingly.

The application 120*a* then determines the radius. Depending on the map application/third-party map service provider, the implementation will vary. For example, for Google Maps, the process is as follows:

float zoomLevel=map.getCameraPosition( ).zoom double radius=Math.pow(Math.
    $E,((16f-\text{zoomlevel})*\text{Math.log}(2)))/2$ The first line references the map (which is an instantiation of the map on the screen the user is looking at), gets the camera position (which is the actual position that the user is viewing it at; this could be at a tilt or an angle for example), and then gets the zoom level. This zoom level is then used to determine the radius of the area by using code above where another calculation is done using the Google Maps zoom level calculation algorithms, which are illustrated in the StackOverflow page entitled "How does this Google Maps zoom level calculation work?", which is incorporated herein by reference.

This radius is then divided by 3.5 so as to match the width of the screen plus some extra padding and then passed into the Google Maps API to determine a new camera position:

```
CameraUpdate cameraUpdate=calcZoomLevel(new
    LatLng(lat,lng),(lnt)(getRadius( )*1000/3.5));
```

This new cameraUpdate object is fed to Google maps and it zooms into the location specified.

An illustrative example of an implementation of this feature using Apple Maps is follows. This utilizes a built-in system where the centerCellRegion is the square of the area being selected:

```
func centerMapOn(frame: CGRect) {
    let centerCellRegion = self.mapView.convert(frame,
    toRegionFrom: self.gridCollectionView)
    DispatchQueue.main.async {
        self.mapView.setRegion(centerCellRegion, animated: true)
    }
}
```

Figure 8:
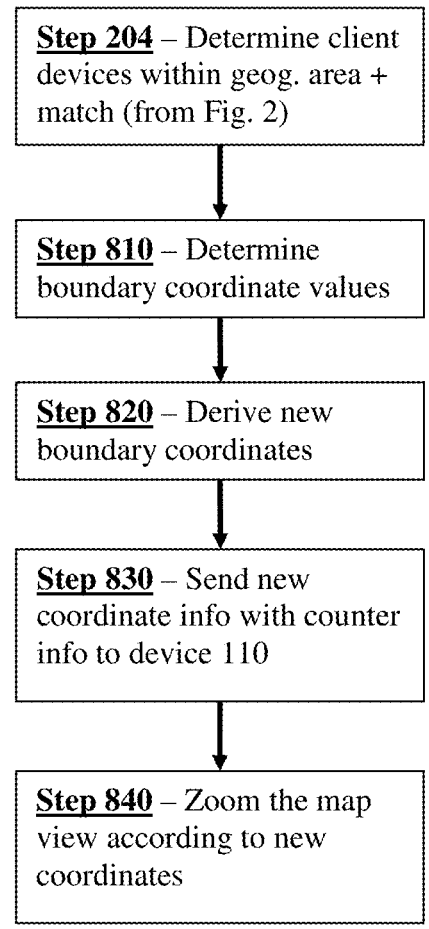
FIG. 8 illustrates a flowchart of a zoom-in process according to embodiments of the inventive subject matter.

In other embodiments, the server 101 performs more of the zoom-to-fit process. The process executed by the system 100 is illustrated in FIG. 8.

As discussed above, the server 101 determines all of the devices 110b-n that are within the search area and match the demographic characteristic(s) of the request at step 204 of FIG. 2.

In these embodiments, the server 101 then reviews the coordinates of all of the counted devices 110b-n to determine the highest and lowest longitude and latitude values (the "boundary" coordinate values) among the counted devices at step 810 (i.e., of the group of counted devices 110b-n, which device is farthest north, which is farthest south, which is the farthest east, and which is the farthest west).

At step 820, the server 101 then derives two coordinates that each contain a pair of the extreme values from step 810 (one of the extreme longitude values and one of the extreme latitude each). As these coordinates will be used to zoom the map in on requesting device 110a, the coordinates derived by the server 101 at step 820 correspond to the same two corners of the square for which device 110a sent coordinates in the original request at step 202 of FIG. 2. Thus, if the first coordinate sent at step 202 corresponded to the bottom left of the square (x1, y1), the coordinate derived by the server 101 for the application 120a to use as the "new" bottom left would be (western-most coordinate value, southern-most coordinate value). Likewise, to replace (x2, y2) which corresponds to the upper right corner of the square, the coordinate of the "new" top right would be (eastern-most coordinate value, northern-most coordinate value).

At step 830 shown in FIG. 8, the server 101 then sends the new coordinate information along with the counter information of step 205 to the client device 110a. Thus, step 830 replaces step 205 of FIG. 2. In response to receiving the new coordinate information, the application 120a displays a zoom icon (e.g. a circle or other icon). Upon the user pressing the icon, the application 120a contacts the third-party map provider to zoom the view of the map such that the new coordinates match up with the respective corners of the square at step 840. Depending on the values of the new coordinates, this can also result in a shift in the centerpoint of the map displayed by application 120a.

It should be noted that, as in the various embodiments discussed herein and unless expressly noted otherwise, the actual locations of the plurality of devices 110b-n are never displayed in the map viewed by the user on device 110a. Thus, though the map resizes as discussed above to better fit the actual locations of the counted devices, the specific locations of the counted devices is not reported to the user via the map. This allows the requesting user to have a better idea where the people sharing his interests are without compromising the privacy and anonymity of the other users of the system.

Figure 9:
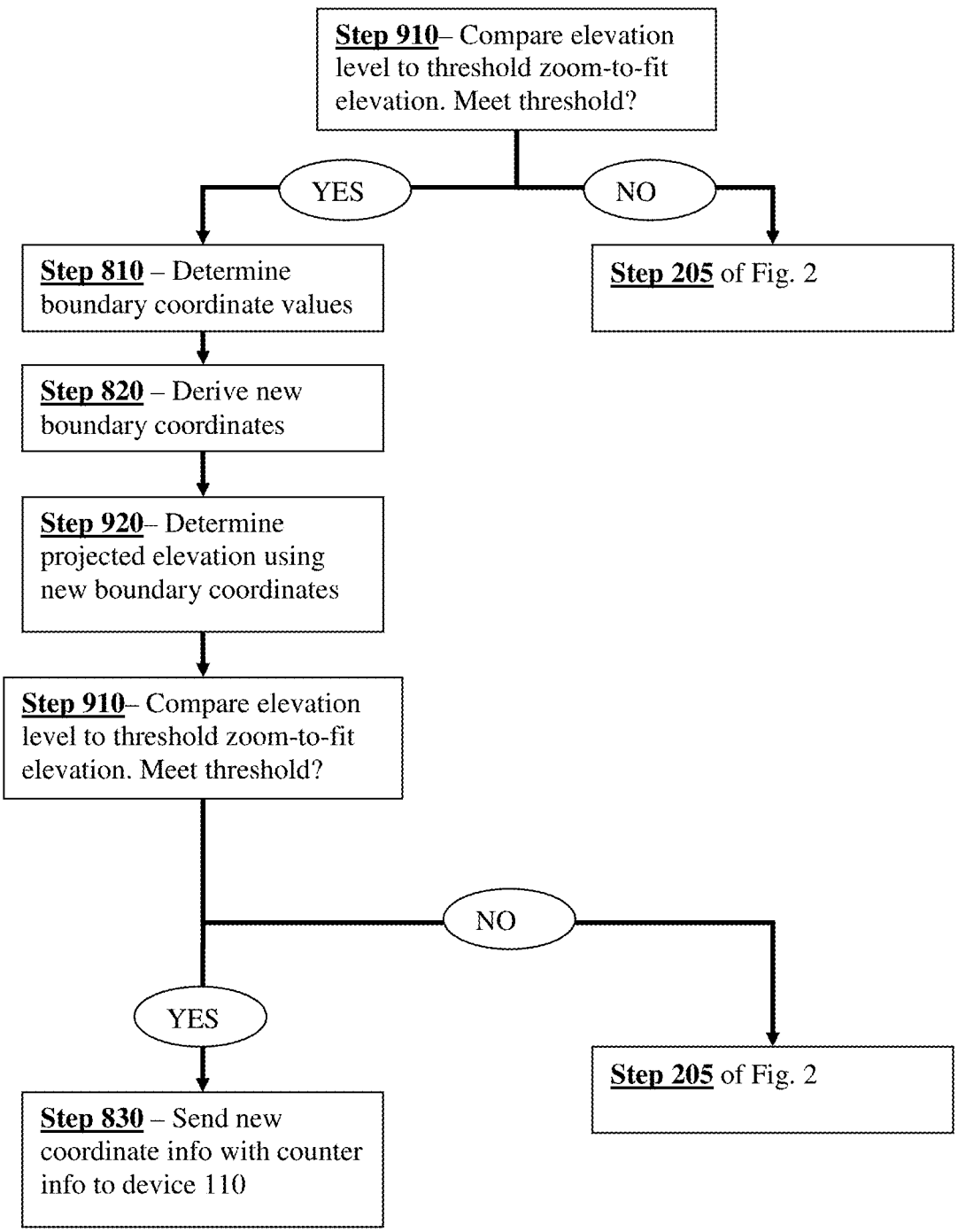
FIG. 9 illustrates a flowchart of a variation of the zoom-in process, according to embodiments of the inventive subject matter.

In a variation of these embodiments shown in FIG. 9, the server 101 first determines whether the elevation level calculated at step 203b is greater or equal to a threshold zoom-to-fit elevation (e.g. 1000 feet) at step 910. If the elevation exceeds the threshold zoom-to-fit elevation, the server 101 then proceeds to steps 810 and 820 of FIG. 8. If the determined elevation is not greater or equal to the threshold zoom-to-fit elevation, the process proceeds to step 205 of FIG. 2.

Having derived the new coordinates at step 820, the server 101 then calculates the projected elevation (the elevation that a map would have with the new coordinates as corners) using the new coordinates at step 920, such as in the manner discussed with regard to step 203b and compares the projected elevation against the threshold zoom-to-fit elevation at step 930. If the projected elevation is greater or equal to the threshold zoom-to-fit elevation, the process proceeds to step 830 of FIG. 8, where the server 101 sends the new coordinates to the requesting device 110a for resizing.

In embodiments, if the projected elevation is less than the threshold zoom-to-fit elevation, the process defaults to proceeding to step 205 of FIG. 2, where no ability to zoom-to-fit is provided or applied.

In other embodiments, the server 101 is programmed to calculate the centerpoint between the two new coordinates found at step 820. As discussed above, the elevation value is related to the value from the corner coordinates (x1, y1) and (x2, y2). In the illustrative example here, the elevation distance is equal to the distance between the centerpoint coordinate of the square and a corner coordinate. Thus, the server 101 is programmed to use the threshold zoom-to-fit elevation value extending outward from the centerpoint to determine the threshold zoom-to-fit coordinates. The server 101 then sends these new coordinates with the counter information to the client device 110a.

In the system discussed in the '617 Patent, a user is able to set a particular location as invisible (such as their home) so that, while at home, the user's device is not counted as part of a count of a plurality of users within a particular area. However, it is possible that away from the designated area, a user could be faced with the embarrassing or potentially dangerous situation of being the only user of system 100 at a particular location, which may translate to them being the only person at a particular location (e.g., a bar or restaurant).

In this situation, another user could determine that a user is alone or in a small group of users of system 100 in a particular location via the application 120 and, upon arriving the actual location, would be able to easily determine that the user is the one (or one of a small group) being counted at a particular location. As such, the anonymity and privacy otherwise provided by the systems of the '617 Patent afforded by being counted but not specifically identified among a large number of users at a particular location or area would be removed.

In the "real world", this situation does not present itself. If a person goes to a location such as a bar or restaurant, they won't know who is there ahead of time and won't have any information about the people already present in advance. Therefore, there is not an increased risk of embarrassment or harm from a stranger to anyone already present at the location. This is only a problem created in online systems such as the one in the '617 Patent. Because each user shares personal information about themselves via the demographics characteristics and because a searching user is able to zoom in on a map to the level of individual locations, a user seeing the counter showing a single user (or low number) present in a location could go the location in person and make the connection between the demographic characteristic and the specific user. Depending on the characteristic used to search, this could be embarrassing for the identified user. Worse, this could leave users vulnerable to stalkers or other ill-intentioned users that could seek out these small groups or individuals based on their identified interests and then target these users by going to the locations in person.

To remedy this problem in prior systems, in embodiments of the systems and methods of the inventive subject matter, the system 100 is programmed to refrain from displaying a counter if the number of counted users is below a pre-defined threshold of counted users within at a particular zoom or elevation level. In a variation of these embodiments, the system 100 is programmed to refrain from displaying a counter if the number of counter users is below a pre-defined threshold of counted users and the size of the geographic area viewed by the requesting computing device 110 (for which the counter is being requested) is smaller than a threshold area size.

Figure 10:
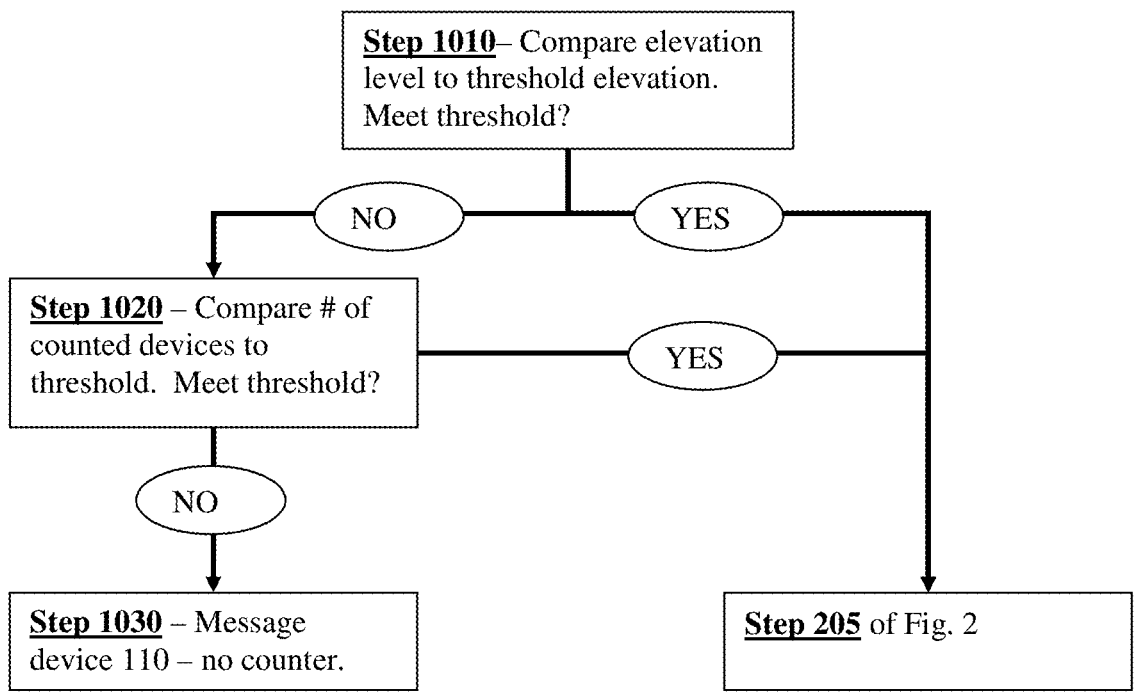
FIG. 10 provides a flowchart of the steps executed by the system to enhance user protections, according to embodiments of the inventive subject matter.

FIG. 10 provides a flowchart of the steps executed by the system 100, according to these embodiments of the inventive subject matter.

Either via a first search upon initiating application 120, or due to a scroll or zoom of the map displayed by application 120, the application 120 of requesting mobile device 110 submits a request to server 101 as described above with regard to steps 201-202 of FIG. 2.

As with the process of FIG. 2, at step 203, the server 101 receives the request and determines the geographic area that is being viewed on the computing device 110 as well as the elevation level of the current view of the map and, at step 204 determines whether any of the client devices 110b-n are within the geographic area and match demographics characteristics with the requesting device 110a as discussed above, and counts the total that match both of these conditions.

In these embodiments, the server 110 then compares the determined elevation level with a threshold elevation level at step 1010. If the determined elevation level is below the threshold elevation level (i.e., the determined elevation level is lower than the threshold elevation level), the server 101 compares the amount of devices 110b-n determined in step 204 with a threshold amount of devices at step 1020.

If the server 101 determines that the amount of the devices 110b-n is below the threshold amount of devices at step 1020, the server 101 sends a message to the requesting device 110a indicating that the threshold amount of devices for the elevation level was not met at step 1030. Since this message does not include the actual number of devices counted, the requesting device 110a does not generate a counter. In embodiments, the requesting device 110a can display a message to the user indicating that there is an insufficient amount of requesting users at the current elevation level of the map to display the counter. The message can include instructions to the user to zoom out to be able to see a counter for a wider geographic area.

Thus, if at a higher zoom level a greater area has above the threshold number of users, the system 100 would display the counter. However, if the user zooms in and a zoomed-in area being counted falls below the threshold (such as a quadrant of the zoomed-in area or the particular area around a pin or around a central icon of the interface), no counter is displayed for the particular area.

In these embodiments, if the elevation level is greater than equal to the threshold elevation level at step 1010 or the number of devices counted is greater or equal to the threshold number of devices at step 1020, the process continues to step 205 of FIG. 2.

By executing the process of FIG. 10, the system 100 of these embodiments allows a user to see whether there are any other similarly-interested users across a wider geographic area (or enough other users in the larger area to potentially interest the browsing user) by showing the counter at elevations above the threshold even if the actual number of counted users is very low while maintaining the safety of privacy and anonymity of individual users.

In alternative embodiments of the inventive subject matter, the system can be programmed to, if a certain area has less than a threshold of counted users, to not display the counter. Thus, in these embodiments, the server 101 would send the message to the client device 110 without counter information (and/or with instructions not to display the counter) and the device 110 would not display the counter for a number lower than this threshold regardless of the zoom level.

Figure 11:
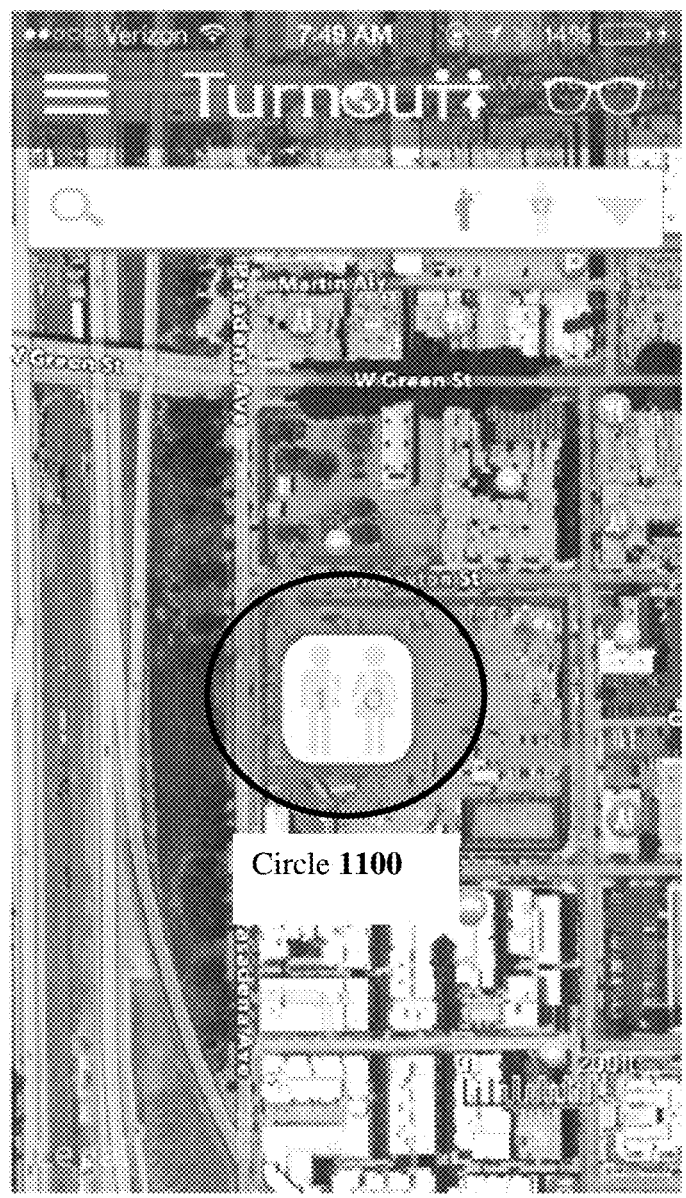
FIG. 11 illustrates a screenshot of application showing the various aspects of the inventive subject matter.

FIG. 11 illustrates a screenshot of application 120 showing the various aspects of the inventive subject matter discussed herein. A user can search for an area within which to find people according to desired filter characteristics by scrolling and zooming into an area. FIG. 11 also illustrates the central circle 1100 that, in the embodiment shown, designates the area to which the provided counter applies.

If, in the screenshot shown in FIG. 11, a user zooms in closer to the area (according to the inputs used to interact with the map, such as via pinching or via a zoom tool), neither the size of the circle 1100 on the screen nor the location of the circle on the screen will change. Thus, zooming in would take up less of the real world area (so a smaller area of the block between Dayton and Valley Streets in the map). The counter would be updated by the system 100 to reflect only the users within this smaller real-world area. Conversely, zooming out would have the opposite effect, with a bigger real-world area covered by the circle and the counter updated to reflect the users within this larger area.

In embodiments, the system 100 further enhances privacy and security by determining, by the server 101, whether a particular location or area is a private place or a public place and, based on this determination counts or does not count user devices reporting within the particular area to include in a counter.

As used herein, a "public" location or area is considered to be an area or location where reporting devices 110 (via application 120) located within the area or location are counted by the server 101 in the determination of a counter value. A private location or area is considered to be an area or location where devices 110 within this private area are not counted by server 101 in the determination of a counter value. In these embodiments, any area not designated as a public location or public area within the system 100 is considered a private area. Typically, public locations as used herein correspond to real-world locations as stores, parks, or other places open typically to the public, but they are not required to correspond as such in all instances.

In many map applications, "types" or other categorization labels can be added to certain locations or points of interest that may assist in searching and/or filtering results in the map application. For example, the Google Places API web service has a list of values for the types whereby a location can be labeled as type of place such as a "bank", "pharmacy", or other type of place. Additionally, for certain locations or points of interest, a map application may also have information such as photos, website information, address and other data. However, a public location for the purposes of the inventive subject matter may include real-world locations other than just a store. Likewise, a public landmark may be prominently indicated on a map but may not actually be publicly accessible (e.g., certain government facilities).

In one embodiment, the server 101 can determine whether a particular location is public or private based on whether a location has information that includes hours of operation. In these embodiments, the server 101 determines whether the information for the particular location includes a field for hours of operation—a data field indicating when the particular location is open to the public. If such a field is present, the server 101 determines that the location is a public location. This information can be obtained by the server 101 via crawling a website associated with a location, via information available from third-party map applications (e.g., Google Maps often contains information about locations such as hours of operation for a business or other public place).

In most embodiments, the server 101 only looks to see whether hours of operation information exists—not what the actual values of the hours of operation are. As such, in these embodiments, any location that includes hours of operation is considered a public location by the server and any location lacking hours of operation is considered a private location by the server. However, in other embodiments, the server 101 can be programmed to compare the hours of operation values of the point of interest against the current time at the location of the point of interest and, if the current time is within the hours of operation, categorize the location as a public location. If the current time is outside the hours of operation values (i.e., the real-world location is closed), the server 101 categorizes the location as a private location.

If a point of interest on a map does not natively include an hours of operation field in the map data, the server 101 can be programmed to conduct an internet search for hours of operation information. To do this, the server 101 conducts an internet search via an internet search engine using the name of the location as provided by the point of interest on the map. If the map information includes a URL for the website of the location, the server 101 accesses the website and, via an analysis of the website, determines that the location has hours of operation.

Typically, most places deemed private (e.g., private homes or residential areas) will not be points of interest in a map application because the information for it to be a place of interest has not been entered into the map application. Thus, in these embodiments, the system is programmed to treat the whole world as a private area by default, with public areas determined according to the processes discussed herein. However, by filtering according to hours of operation, the system also avoids including places that may be "public" in that they are well-known due to their fame, recognition or importance as real-world locations but not publicly accessible, such as a secret government facility, a company's prototyping center, etc.

In embodiments, the area of the public location for the purposes of the system 100 can be deemed a certain circular area around a particular point (such as a designated point of interest on the map that may not encompass the entirety of the public real-life area or location). Thus, for a particular location deemed a public area, the area within which devices 110 are counted towards a counter would be those within the circular area surrounding the point of interest that indicates the location on the map application.

Some map applications include map information for the interior of certain locations, such as the interior of shopping malls, stores, etc. that can be accessed via the most zoomed-in level of view when using the map application or via a selection of an interior map. For these map applications, the server 101 can apply the detailed information of the interior map for the purposes of determining the size of the public location, and thus use that interior map against which to compare the locations of reporting user devices 110 to determine whether they are to be counted as being present in the public location.

In some embodiments, the server 101 can determine a density of devices 110 within a particular area relative to a threshold density. In one embodiment, the density of devices 110 in a particular area can allow server 101 to determine whether to designate a location as public or private. In preferred embodiments, the threshold density can be adjusted depending on one or more additional parameters. In one example, the threshold density of devices 110 can be set to fifteen devices 110 per half-square mile. If the density is above that amount in a first location, the server 101 can designate the first location and the area corresponding to the location as public. On the other hand, if the density is below fifteen devices 110 per half-square mile in a second location, the server 101 can designate the second location as private. In embodiments where the location is designated as private, it is contemplated that any devices 110 in the location will not be visually indicated on the map.

In embodiments, the server 101 can also be configured to consider a set area around a point of interest, such as a particular device 110, as a public area. For example, a device 110 associated with a grand marshal of a parade could be considered a point of interest causing server 101 to set a quarter-mile radius around the device 110 as a public location. In these embodiments, the application 120 allows a user to designate the device 110 as the point of interest so that it is considered a public place. The device 110 transmits a request to make the device 110 a public place to the server 101, along with the device's location information (e.g., GPS, etc.). The server 101 then flags the requesting device 110 as a public place. The device 110 requesting to be a public location/area can be any of the devices 110a-110n. Thus, the device 110a that searches for other devices 110b-n could designate itself a public place via the request to the server. Alternatively, the request to be a public area/location can come from one of the mobile devices 110b-n and thus could be used to find it and other devices 110b-n near it via the search request from requesting device 110a.

In another embodiment, the server 101 can set locations that would normally be considered private as public in certain circumstances. For example, server 101 can set a location of an emergency situation, such as an area affected by a landslide, as a public location to allow devices 110 in the designated area to communicate and broadcast their respective locations.

In embodiments, the server 101 can designate a location as a public location based on available reviews of the location. In these embodiments, the server 101 can retrieve information from sources such as online review websites or other electronic sources and designate the location as public if the location has a number of reviews (positive and/or negative) that is greater than or equal to a review threshold. If the server 101 determines that the number of reviews is greater than or equal to this threshold, the server 101 marks the location as a public place.

In a variation of these embodiments, the server 101 can determine whether a location is public or private by analyzing user feedback about the location. It is contemplated that user feedback regarding a location can be obtained from any available sources, including, for example, online review websites, literature regarding the location, video content, photo content, and any other source of information that assists in characterizing a location. For example, server 101 can parse five travel review websites for a metropolitan area and determine a composite score for particular locations (e.g., restaurants, bars, and parks). Any metric can be used to determine a score for any location, including, for example, the number of reviews, the rating of the review, and the amount of time between the reviews.

In some embodiments, the composite score can correspond to the density of people likely to be in the location at one or more times throughout the day. Depending on the composite score, server 101 can designate a location as public or private. In some embodiments, the hours of operation, if applicable, are weighed against other factors in determining whether a location is public or private. For example, server 101 can determine that a venue is never open between 9 P.M. and 6 A.M., which will cause server 101 to weigh heavily against categorizing the venue as public during those hours. In a related example, if server 101 determines that people visit the venue outside of official hours (e.g., a park that turns the lights off at 6 pm) then the presence of devices 110 during those hours will weigh in favor a public designation. In yet another example, server 101 can weigh various long term factors such as how long of a duration (e.g., days of the year that the sun sets after 6 P.M). Again, in embodiments where the location is designated as private, it is contemplated that any devices 110 in the private location will not be visually indicated on the map.

In public locations, it is contemplated that devices 110 can communicate with any other device 110 either individually, as a part of the whole, or every device 110 in the area defining the public location. In some embodiments, it is contemplated that one or more devices 110 can be configured to opt out of services, such as messaging and geolocation services. It is contemplated that devices 110 can also be configured to opt-in to services, such as by allowing a geolocation to be displayed and messaging from other devices 110 within the private location.

In other embodiments, devices 110 can have one or more associated parameters allowing for custom configuration of different services, such as, for example, a messaging service or a geolocation identifier. For example, server 101 can selectively send out messages to particular groups of devices 110 associated with a particular parameter, such as a parameter that indicates that a first group of devices is interested in updates about the upcoming hip-hop performances at a music festival.

Figure 12:
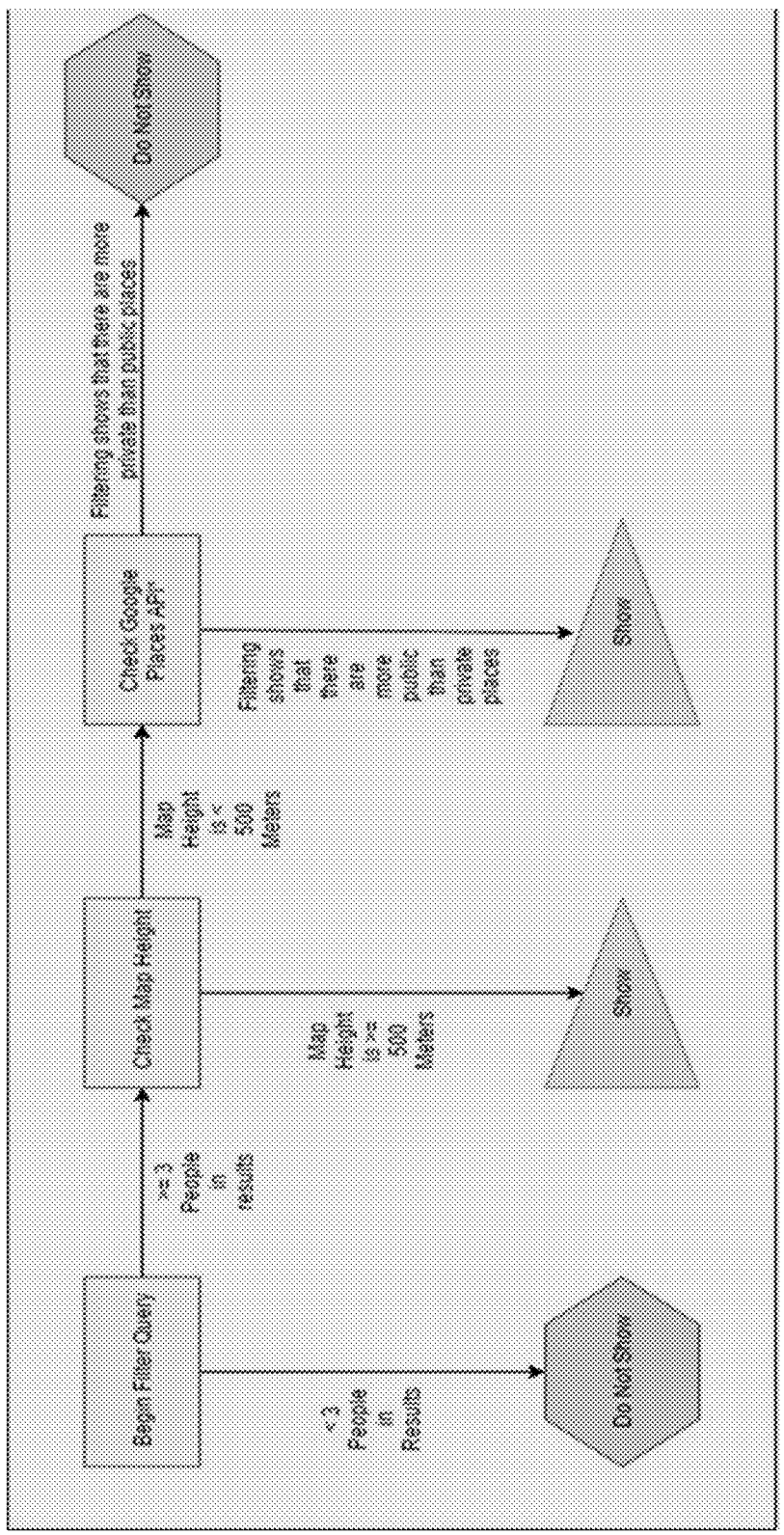
FIG. 12 provides an illustrative flowchart of a hybrid/combination process executed by the system, according to embodiments of the inventive subject matter.

In embodiments, the server 101 is programmed to display a counter based according to the number of users counted in a particular area, the level of zoom, and/or the ratio of private to public places in a particular area. These embodiments illustrate a combination of various features discussed herein. FIG. 12 provides an illustrative flowchart of this process, which functions as follows.

If the devices 110 within a certain area is below a threshold (in the example of FIG. 12, three devices reflecting three people within the area), then the server 101 does not display the counter. The determination of whether this threshold is met can be performed in a similar manner to the process discussed above.

If the server 101 determines that the number of devices 110 in the area are greater than or equal to the threshold (in this example, greater than or equal to three), the server 101 proceeds to check the zoom level. In this example, this is provided in terms of map height (i.e., simulated height off the ground), which is determined as discussed above. If the zoom level is greater than or equal to a zoom threshold (i.e. the map is zoomed out at a greater than or equal to minimum zoom level), then the counter is displayed. In the flowchart of FIG. 12, the threshold is 500 meters of "altitude."

It should be noted that in the process of FIG. 12, the server 101 determines whether the threshold number of devices is met first then determines whether the zoom level threshold is met. However, it is contemplated that the order of these processes can be reversed, similar to how it is performed in the process illustrated in FIG. 10.

If the map height (zoom level) is less than the threshold (here, 500 meters), the server 101 proceeds to check the various locations shown on the map at the current zoom level to determine what amount of the map displayed includes public locations versus private locations. The public location determination for the locations or points of interest can be performed according to the process discussed above, to determine the public locations of the map and what area of the map the public locations occupy. If the public location area meets or exceeds a threshold (in this example, the public location area is greater than the private location area), the server 101 causes the application 120 to display the counter for the area. If the private location area is greater than the determined public location area, the server 101 does not cause the application 120 to display the counter for the area.

In a variation of this embodiment, the server 101 checks how many of the counted devices 110*b-n* are within public areas in the geographic area of the map and can adjust the counter returned to the device 110*a* accordingly. The determination of public areas is discussed elsewhere herein. In these embodiments, the server 101 can optionally re-check the number of devices 110*b-n* within public areas against the threshold to determine whether the counter should be shown.

It should be noted that the Google Places API does not natively include an indication of whether a place is public or private for the purposes of system 100. The server 101 can determine whether a 'place' according to the Google Places API via the various methods of assigning an area as a public area or a place as a public place as discussed herein.

One challenge arising from existing systems is that, because the distribution of users in an area is performed using a flat horizontal plane of a map, those systems are not able to distinguish between users in a vertical structure such as a high-rise, where there may be users at different heights. In particular, if a building has some floors as commercial space (and thus would be otherwise considered "public" locations where user numbers are counted) and other floors as residential space (and thus "private" locations where the users are not counted), using a two-dimensional area map alone would not allow a system to distinguish between the different types of areas.

To solve this challenge, the systems and methods of the inventive subject matter can, in embodiments, use the elevation information from one or more devices within a certain area to determine whether a particular location within a building is a public or private location.

If the representation of the public real-world location (determined to be a public location within the context of system 100 as discussed herein) in the map application (e.g. the point of interest corresponding to a restaurant, bar, etc.) includes elevation information, the server 101 uses altitude information obtained from the devices 110b-n (e.g., altitude information obtained from the devices' GPS interfaces) and compares them against the elevation information of the point of interest to determine whether the device is actually at the real-world public location (and thus, within a public location in the context of the system 100). To do so, the server 101 can determine whether each device is within a certain vertical distance of the elevation information (to account for errors in altitude measurements from the devices, to account for possible different floor surface levels within a same floor of a building, etc.). For those devices that are within the vertical distance threshold, they are considered to be within the public location and thus counted. Those devices that are outside of the vertical threshold are deemed to be outside of the public location and thus not counted.

If the map information of the point of interest of the public location does not include elevation information, the server 101 nevertheless determines whether certain devices are within a public or private location based on the altitudes of the devices 120 reporting from the building. To do so, the server 101 clusters the reported altitudes of the devices 120. If a certain number of them exceeding a threshold are within a vertical distance range represented by the cluster (and, optionally, also by a pre-defined maximum distance considered to be the maximum separation that devices could have and still be on the same floor of a building), then the devices 110b-n within the cluster are considered to be on the same floor and also within the public location because it is unlikely that the number of devices required to exceed the threshold would be all be at the same elevation at the same time within a private location. Those not within the public location (i.e., outside of the altitude range of the cluster or otherwise determined to be statistical outliers in terms of vertical positioning relative to the group) are not considered to be within the public location and thus not counted.

The system of the inventive subject matter is, in embodiments, programmed to access a user's contacts in one or more third-party applications (e.g., phone contacts list, email contacts list, social network-specific contacts, etc.) to provide another way to find users that can include their contacts within the search results. The contacts may be contacts the user is familiar with that require specific entry by the user into the third party application (such as phone contacts in a phone or directory application), contacts with which a user has a fully reciprocal or symmetric communication ability with (e.g., Facebook friends having the same access or viewing privileges for each other's accounts such as pages, walls, comments, posts, etc.), or contacts that are of an asymmetric nature where a particular user may not be familiar with the user or where establishing the user requires a simple approval without more contact established (e.g., Twitter followers where a user may not necessarily be reciprocating the follower, Instagram followers where a user does not follow a particular user back, etc.).

As discussed herein, the user's contacts information generally refers to information associated with a user's contacts in a third party application and/or social network. This can include contact names, contact screen-names or usernames, contact email addresses, contact phone numbers, etc. The process used by the system to integrate user contacts information is as follows:

In this embodiment, a user can be required to add information that allows the system to access a user's contact information of a third party application. For "contacts" applications such as those having phone contacts and/or email contacts (or a combination therein) that are installed on the user's device, the application 120 installed on the device 110 prompts the user for permission to access the information of the contacts application. For applications requiring login credentials and/or where the contact information is not stored locally but in a server corresponding to the particular application (such as a social network, cloud-based service, email service, etc.), the system 100 can require the user to add information related to one or more third party applications that will allow the system 100 to access the user's contacts list information in the third party application. For example, the information can include an identification (or selection from a pre-populated list) of an application or social network, a username for the application or social network, login credentials for the application or social network, an email address associated with an application or social network account, etc.

The system 100 first obtains the user's contacts information by accessing a contact or friend's list and obtaining the relevant contact information from the application or social network (e.g., via contacts entries in an application; social network friend lists, "follower" lists, "following" lists, subscriber lists, etc). In embodiments, the system 100 can also obtain contacts via an analysis of a user's social network posts and obtain the usernames of users that have submitted comments, likes, re-tweets, hashtagging, or other expressions or feedback connected to a particular post.

The server 101 then compares the obtained contact information against contact information of a same type in the profiles of other registered users of system 100. Thus, for usernames of a particular social network, the server 101 matches the obtained social network screen name against the entries of that same social network in other users' profiles.

In these embodiments, the application 120 allows a user to apply a filter of friends/contacts to the counters of users in a particular geographic area (such as the counters discussed in the '617 Patent). Thus, the counter displayed to the user is filtered according to the matches found at step 202. The process of step 202 can be performed at the time when a user opts to allow the use of their social network or other contacts, or at the time the user actually activates the filter in application 120.

Thus, if a user selects to a filter corresponding to "Instagram followers" the system 100 is programmed to filter out any users within the particular geographic area that have not been matched as Instagram followers and the counter of users for the area would only show "Instagram followers". The filtering discussed herein can be used in combination with any other filters according to user characteristics, such as those discussed in the '617 Patent.

Figure 13:
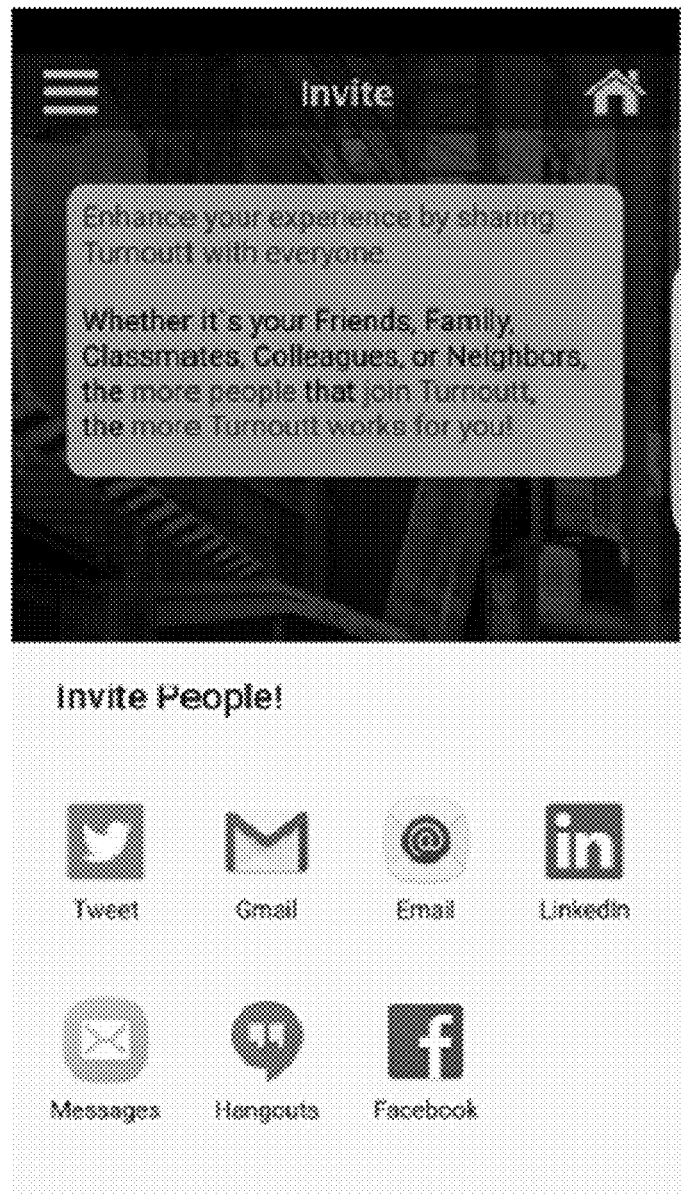
FIG. 13 shows an example screenshot of application that allows a user to invite other contacts from social networks, email contacts, or other contact sources to the system, according to embodiments of the inventive subject matter.

FIG. 13 shows an example screenshot of application 120 that allows a user to invite other contacts from social networks, email contacts, etc to the system 100. However, it is contemplated that a similar prompt can be presented to the user to search for other contacts already using system 100 as discussed herein for the purposes of creating the 'contacts' filter characteristic.

In embodiments, the system 100 allows users to set up groups for people with like-minded interests, or for friends. Other users can be invited to join the groups or allowed to subscribe to the groups. FIGS. 14A-14E illustrate various features associated with searching for, selecting, and joining groups. As seen in FIGS. 14A-14D, it is contemplated that groups can be sponsored, with the groups sold like domains. Multiple cost options can be provided for a group based on a selected length of the sponsored group.

Figure 14A:
FIGS. 14A-14E illustrate various features associated with searching for, selecting, and joining groups, according to embodiments of the inventive subject matter.
Figure 14B:
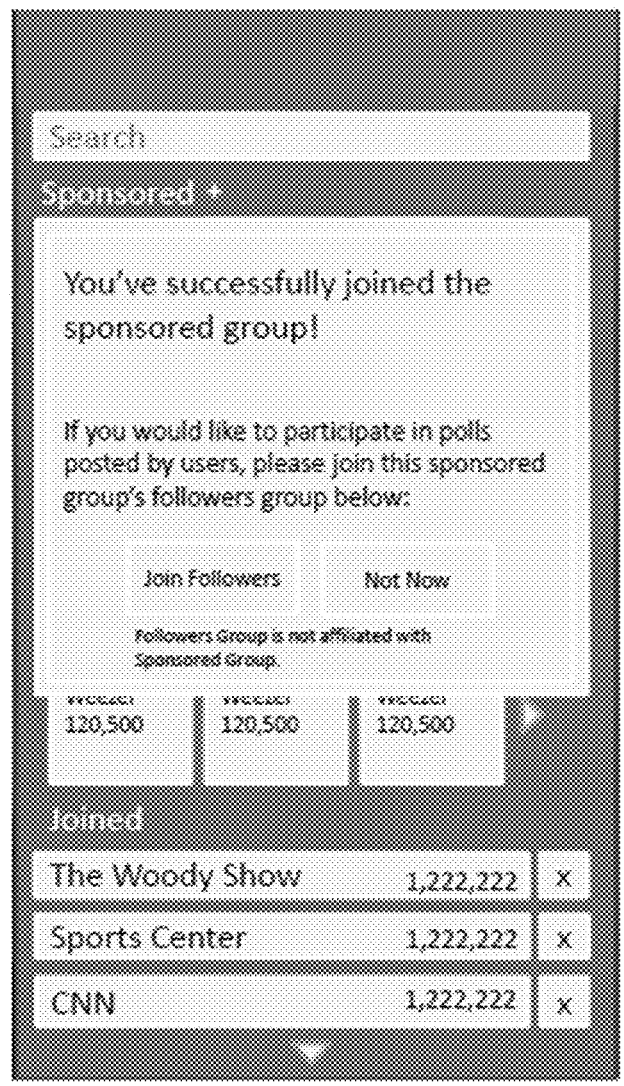
Figure 14C:
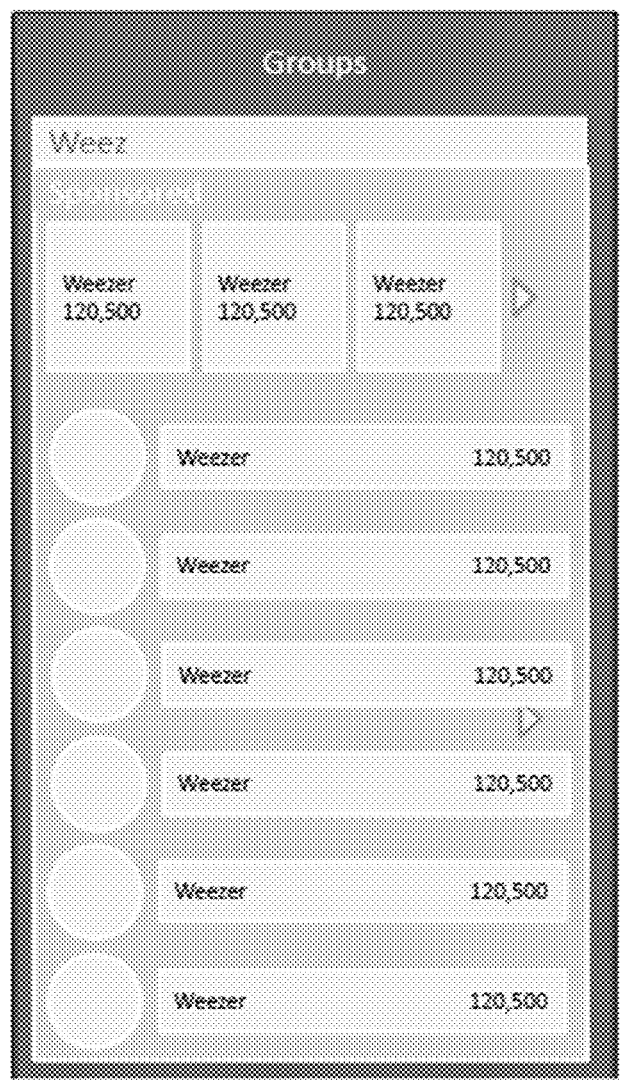
Figure 14D:
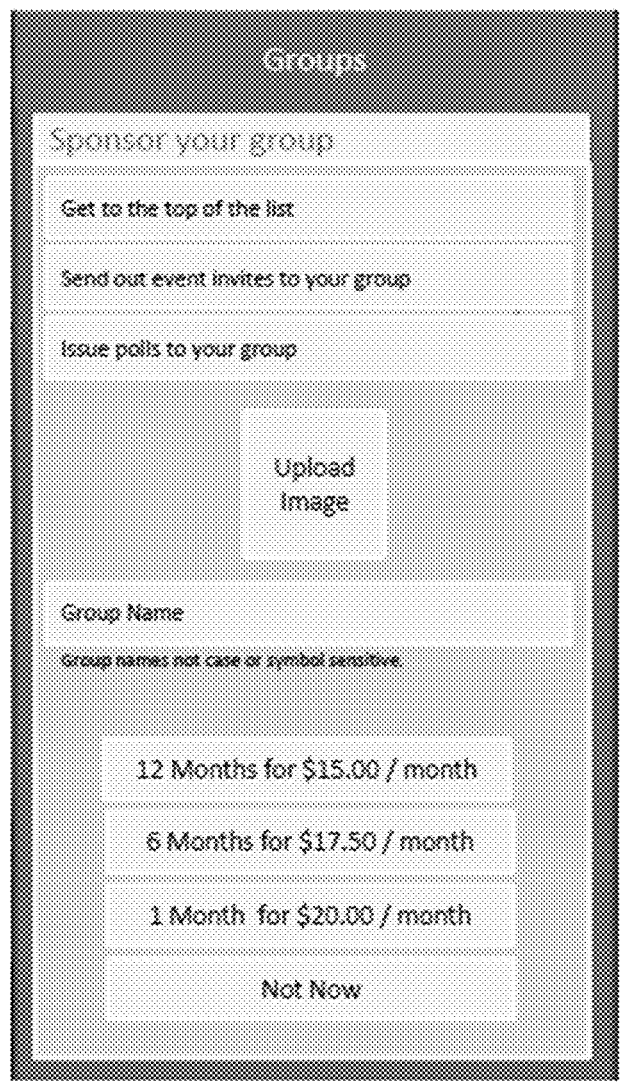
Figure 14E:

A group administrator or other group member given the proper authority can perform certain actions such as send polls to the group members, designate rally pins at a location on the map that is then pushed to the members of the group to indicate a location such as a meeting point, or send other information to the users. FIG. 14E illustrates the placement of a rally pin 1410 (in this case, the Sigma Nu Super Bowl Party).

In embodiments, the application 120 enables users to create polls.

A poll could include a question that, via the response by the users in a location, provide additional demographic or other characteristics of the user for instant or short-term categorization by other members of the group or by other users outside of the group. In other words, the server 101 creates a new custom characteristic for the users that answer the poll, with the custom characteristic being the poll answer of the user. The poll can be sent to the entire group or to those of the group in a particular area. For example, a group of a particular political party could send a poll to the members of the group asking who of that political party is attending a town hall meeting of a congressperson of the opposing party (designated by a particular location). The response by those in that area would then allow the group organizer to know how many of "their" people are in attendance among those that they oppose, without revealing exactly who they are. This could then be broadcast by the group organizer to the remainder of the group or even to the user base of system 100 at large to show others that might be interested in attending the town hall that they will not be the only one of that group in the crowd. The user can also use the custom characteristic as a filter so as to filter the returned results for that user such that the counter shows those other users that have the same custom characteristic (i.e., the same poll answer). This new filter can be used in combination with other filters the user may have selected.

In a variation of these embodiments, the poll and the custom characteristic created via the poll can be of short-duration (e.g., 10 seconds, 5 seconds, 30 seconds, a minute, or other set time length) and/or of a single-use, after which the poll question and any data generated by the poll question are deleted from the user device after a particular amount of time and/or after the user submits an answer. This way, a user minimizes the risk of being exposed in a situation as a user of the system 100 in a situation that may cause them embarrassment or put them in danger (e.g. if someone were to accidentally see the app on their phone, their phone were to be confiscated by personnel at an event, etc.). Similarly, the answer to a poll question by each user and the overall poll results can be saved "permanently" (i.e., for an indefinite amount of time) by the server 101 or for a limited amount of time, after which the server 101 deletes the poll results. This allows users to be counted by the server 101 for use in counters presented to other users having selected the same poll answers as either a permanent characteristic or a temporary one (for use in connection to a temporary event or reflecting an expression of a temporary opinion, for example).

A poll could be created to broadcast to a particular group, or to a particular area (selected via a pin placement on a map, a selection of an area on a map, an address entry or other way to designate a location or area on a map). The pricing of creating the poll can be set to depend on the scale (e.g. level of zoom used for the area of coverage and thus, the real-world area covered). The polls broadcast to a group are only sent to those group members, regardless of their location. Likewise, polls broadcast to an area are broadcast to any users (not just those of a particular group) in that particular designated area. It should be noted that, in embodiments, the system 100 does not send the poll to those in private areas or that have actively designated an area as "hidden" or that have activated hidden mode. In other embodiments, the poll would be sent to those users in hidden or private areas but the results are not returned to the server 101 until the user has entered a public area. In embodiments, the poll can also be broadcast to members of a particular group according to a particular area, so only the members of the group that also happen to be in the particular designated area receive the poll.

It is contemplated that polls can also be embedded in a user's social media or social network feed (e.g., Facebook wall, Twitter feed, etc.)

In embodiments, a member of a group can place a pin on the map to designate a particular area as public for those group members, regardless of whether the area would be public or private according to the criteria discussed elsewhere herein. In these embodiments, the group member places the pin on a map and, optionally, can select the radius of coverage for the size of the public place. This is then broadcast by the server 101 to the various members of the group. The members of the group can be provided the option to opt in (or opt out) of having their devices report as countable within this custom public area. Because only the devices of the group members would be counted (not the user base as a whole) in this custom public area, a resident of a home that happens to fall within the custom designated public area would not be counted in the counter related to this custom public area and as such the privacy and anonymity of that user is maintained. Similarly, a user of the system 100 that is not a part of the group would not be counted as being within the group's public area created by the placed pin and would not show up in the counter presented to the group members.

It is also contemplated that any variety of sensors associated with one or more of devices 110 can be used to provide additional location information or information that assists server 101 in determining whether a location is a public or a private area. For example, in situations where one or more of devices 110 have microphones, server 101 can receive decibel rating data to determine if the area is heavily occupied. In another example, if one or more devices 110 have light sensors, server 101 can determine which individuals are outside of the venue, inside of the venue, and/or on top of the venue based on the color temperature of the light (e.g., 3500 k lighting versus 6500 k lighting). It is contemplated that the inventive concept can use any variety of sensors to assist in determining public spaces.

However, it is also contemplated that the use of non-geolocation-based sensors in the contemplated invention is optional. In some examples, a user of device 110 can toggle the options on and off, which will cause server 101 to make the corresponding changes to the user's profile.

Figure 15:
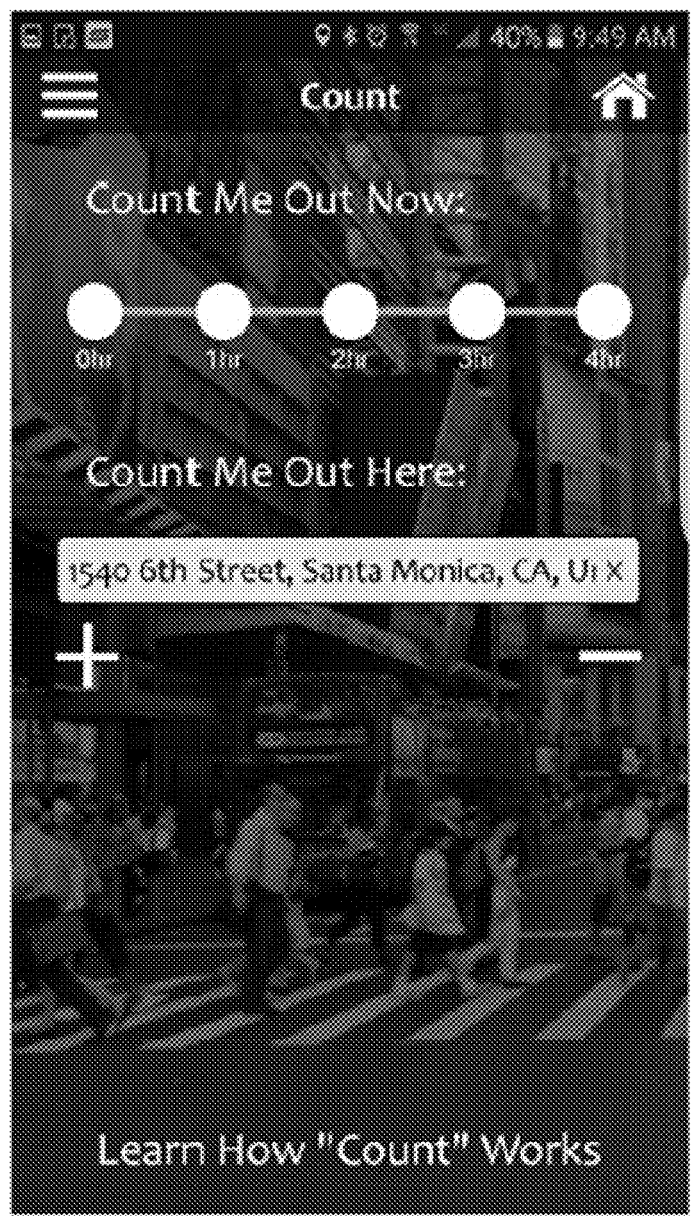
FIG. 15 illustrates privacy settings provided by application, according to embodiments of the inventive subject matter.

FIG. 15 illustrates the privacy settings provided by application 120. As seen in FIG. 15, a user can select a time frame or a location to be "counted out," whereby the application 120 does not transmit information to server 101 for counting the user among those users. A user can add multiple "count out" locations, such as a home or office where their device will not be used by the server 101 for the purposes of the counters discussed herein. In embodiments, the application 120 transmits to the server as normal, but also includes information associated with "counting out" to the server 101 such that the server 101 receives the check-in from the application 120 but the decision to not count the particular device within a counter of users in an area is made on the server-side.

Figure 16:
FIG. 16 illustrates the "Vibes" feature that allows a user to select a vibe reflecting the mood, attitude or interest the user has at a particular point in time, according to embodiments of the inventive subject matter.

FIG. 16 illustrates the "Vibes" feature that allows a user to select a vibe reflecting the mood, attitude or interest the user has at a particular point in time. Each vibe can be considered a data structure includes one or more characteristics that are added to the user's profile for the purposes of filtering and counting while the "Vibe" is active. Thus, it returns other members in a particular area that fit the vibe. In addition, the application 120 can, based on a user's current location, present areas having a certain number of counted users that are of a similar vibe, thus directing a user to locations of people having the same interest. For example, an active vibe might have characteristics such as "sports", "exercise", and other characteristics associated with physical activity. Chill, on the other hand, could have characteristics such as "relax", "beach", "yoga", or other characteristics.

In most embodiments, the characteristics of a particular vibe are such that, to show other users, other users must match all of the characteristics of the vibe or else they are filtered out from the count of the user using the vibe. However, it is contemplated that, because a vibe could simultaneously have a number of characteristics that are of similar theme but of different levels of specificity (e.g., "sport" as well as "biking", "soccer", "basketball"), the server 101 can be, in other embodiments, programmed to show members that meet less than all of the filter characteristics. Thus, if there are users that have selected the "basketball" and "sport" characteristic in their "permanent" profile (i.e., not via selecting a Vibe) but not "soccer", they would still be counted for the purposes of a user selecting the "Active" vibe.

A user can deactivate a selected vibe at any time, which causes the server 101 to remove the characteristics associated with the vibe from the user's profile.

In embodiments, the vibes have a limited duration of time as reflected by a duration attribute in the data structure. Thus, when a user selects a vibe, the characteristics of the vibe are added to the user profile for the purposes of counting and returning counts for the limited amount of time of the vibe. Once the vibe expires, the server 101 removes the vibe characteristics from the user profile. The time duration of each vibe can depend on the particular vibe. For certain vibes, the time duration can be correlated to an estimated time duration of an activity associated with the vibe. Thus, for the "Game On" vibe, the duration might be correlated to the duration of a particular game (e.g., the game of a local team, a playoff game broadcast, etc.) or of a particular day of events (e.g., the duration of time from the start of the first football game on a Sunday until an estimated end time of the last football game on that Sunday). Contemplated durations for the vibe are a day, a week, an hour, 2 hours, 8 hours, or other time increments.

The application 120 can also include features such as a link or integrated functionality from a ride-sharing, mass transit, taxi, or other transportation application or service that allows a user to request transportation to the selected location from within application 120 itself.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:
1. A system, comprising:
at least one server computer programmed to:
receive, from each of a plurality of mobile computing devices, location information corresponding to the location of each of the plurality of computing devices and at least one broadcasted demographic characteristic from a plurality of available demographic characteristics;
(a) receive, from a requesting mobile computing device, a request message comprising:
  map coordinate information corresponding to a map area viewed on the requesting mobile computing device by a map application; and
  at least one selected demographic characteristic;
(b) determine the map area and a map elevation level based on the map coordinate information;
(c) determine, for each of the plurality of mobile computing devices:
  whether the mobile computing device from the plurality of mobile computing devices are within the map area based on the location information of the mobile computing device; and
  whether the at least one broadcast demographic characteristic of the mobile computing device matches the at least one selected demographic characteristic;
(d) count the number of mobile computing devices from the plurality of mobile computing devices that are within the map area and match the at least one selected demographic characteristic;
(e) determine whether the map elevation level is greater than or equal to a threshold elevation value;
(f) in response to determining that the map elevation level is less than the threshold elevation value, determine whether the number of counted mobile computing devices is greater than or equal to a threshold number of mobile computing devices;
(g) in response to determining that the map elevation value is greater than or equal to the threshold value or determining that the number of counted devices is greater than or equal the threshold number of mobile computing devices, transmit the number of counted devices to the requesting mobile computing device to cause the mobile computing device to display a counter with the number of counted devices to the user; and
(h) in response to determining that the number of counted devices is less than the threshold number of mobile computing devices, send a message to the requesting mobile computing device to cause the mobile computing device to refrain from displaying the counter to the user.

2. The system of claim 1, wherein the at least one server computer is further programmed to:
  determine whether at least half of the map area is designated as public area; and
  in response to determining that at least half of the map area is not designated as public area, sending the message to the requesting mobile computing device to cause the mobile computing device to refrain from displaying the counter to the user.

3. The system of claim 1, wherein the at least one server computer is further programmed to:
  receive, from a first mobile computing device from the plurality of mobile computing devices, a request to designate the first mobile device as a public location;
  designate, in response to the request, a geographic area surrounding the first mobile computing device within the map area as a public area based on the location information from the first mobile computing device;
  determining how many of the number of counted devices are within the public area;
  updating the number of counted devices based on the determined number of counted devices within the public area; and
  transmit the number of counted devices to the requesting mobile computing device to cause the mobile computing device to display a counter with the number of counted devices to the user.

4. The system of claim 1, wherein the requesting mobile computing device is from plurality of mobile computing devices.

5. The system of claim 1, wherein the at least one server computer is further programmed to:
  receive, from one of the plurality of mobile computing devices, a request to be excluded from the count of plurality of mobile computing devices;
  adjusting the number of counted devices to exclude the one of the plurality of mobile computing devices; and
  in response to determining that the map elevation value is greater than or equal to the threshold value or determining that the number of counted devices is greater than or equal the threshold number of mobile computing devices, transmit the adjusted number of counted devices to the requesting mobile computing device to cause the mobile computing device to display a counter with the number of counted devices to the user.

6. The system of claim 1, wherein the receiving, from each of a plurality of mobile computing devices, location information corresponding to the location of each of the plurality of computing devices and at least one broadcasted demographic characteristic from a plurality of available demographic characteristics further comprises periodically receiving according to a pre-defined check-in schedule.

7. The system of claim 6, wherein the at least one server computer is further programmed to execute steps (c) through (h) each time the location information and at least one broadcasted demographic characteristic is periodically received.

8. The system of claim 1, wherein the location information received from each of the plurality of mobile computing devices further comprises altitude information, and wherein the at least one server computer is further programmed to:
  determine that the counted devices are within a public area;
  cluster the counted device based on the altitude information of the counted devices;
  exclude any of the counted devices whose altitude information is determined to be an outlier from the group of counted devices; and
  adjust the number of counted devices to account for excluded counted devices.

9. The system of claim 1, further comprising the requesting mobile computing device, and wherein at least one of the requesting mobile computing device and the at least one server computer is programmed to cause the requesting mobile computing device to re-size the map area displayed to the user based on the location information of the counted devices.

10. The system of claim 1, wherein the at least one server computer is further programmed to:
  receive, from a requesting mobile computing device, a second request message comprising:
    second map coordinate information corresponding to a second map area viewed on the requesting mobile computing device, the second map area resulting from a user interaction with the map application on the requesting mobile computing device; and
    the at least one selected demographic characteristic;

determine the second map area and a second map elevation level based on the second map coordinate information; and execute steps (c) through (h) in response to the received second request message and using the second map area and second map elevation level.

\* \* \* \* \*